US012685265B2

(12) United States Patent
Shane et al.

(10) Patent No.: US 12,685,265 B2
(45) Date of Patent: Jul. 21, 2026

(54) FOLDING LINE DIVIDER FOR A HARVESTING PLATFORM

(71) Applicant: CNH Industrial America LLC, New Holland, PA (US)

(72) Inventors: Nicholas Stephen Shane, Rock Island, IL (US); Daniel Christopher Dallman, Eldridge, IA (US); Daenio Cleodolphi, Piracicaba (BR); Marco Aurelio Ramos Pereira, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 277 days.

(21) Appl. No.: 18/274,663

(22) PCT Filed: Feb. 11, 2022

(86) PCT No.: PCT/US2022/016115
§ 371 (c)(1),
(2) Date: Jul. 27, 2023

(87) PCT Pub. No.: WO2022/165445
PCT Pub. Date: Aug. 4, 2022

(65) Prior Publication Data
US 2024/0122121 A1 Apr. 18, 2024

Related U.S. Application Data

(60) Provisional application No. 63/142,274, filed on Jan. 27, 2021.

(51) Int. Cl.
*A01D 63/02* (2006.01)
*A01D 45/10* (2006.01)
(Continued)

(52) U.S. Cl.
CPC ............. *A01D 63/02* (2013.01); *A01D 45/10* (2013.01); *A01D 69/03* (2013.01); *A01D 69/00* (2013.01)

(58) Field of Classification Search
CPC ........ A01D 63/02; A01D 45/10; A01D 69/03; A01D 69/00
See application file for complete search history.

(56) References Cited

U.S. PATENT DOCUMENTS

| | | | |
|---|---|---|---|
| 3,885,377 A | 5/1975 | Jones | |
| 4,270,337 A * | 6/1981 | Pinto | A01D 45/10 56/13.9 |

(Continued)

FOREIGN PATENT DOCUMENTS

| | | |
|---|---|---|
| CN | 105359713 | 3/2016 |
| CN | 108925222 | 12/2018 |

(Continued)

OTHER PUBLICATIONS

International Search Report and Written Opinion for PCT Application No. PCT/US2022/016115 dated Jun. 22, 2022 (14 pages).

(Continued)

*Primary Examiner* — Nicole Coy
*Assistant Examiner* — Jennifer A Railey
(74) *Attorney, Agent, or Firm* — Fletcher Yoder, P.C.

(57) ABSTRACT

A cutting and harvesting assembly for an agricultural machine includes a structural frame. A feed roller is operably coupled with the structural frame. A deflector assembly is operably coupled with the structural frame. The deflector assembly includes a deflector plate at least partially laterally outward of the feed roller. The deflector plate is rotatable between a first position and a second position relative to the structural frame.

14 Claims, 26 Drawing Sheets

(51) Int. Cl.
  *A01D 69/03* (2006.01)
  *A01D 69/00* (2006.01)

(56) References Cited

U.S. PATENT DOCUMENTS

| | | | |
|---|---|---|---|
| 4,299,080 | A | 11/1981 | Kelly |
| 5,377,479 | A | 1/1995 | Wilstrand et al. |
| 6,745,550 | B1 | 6/2004 | Hinds et al. |
| 2013/0019581 | A1* | 1/2013 | Hyronimus ............ A01D 63/00 56/314 |
| 2016/0135365 | A1 | 5/2016 | Cleodolphi et al. |
| 2017/0280626 | A1 | 10/2017 | Bertino |
| 2020/0128742 | A1 | 4/2020 | Richard et al. |
| 2021/0029880 | A1 | 2/2021 | Almeida et al. |

FOREIGN PATENT DOCUMENTS

| | | |
|---|---|---|
| DE | 102015113602 A | 2/2017 |
| JP | 2003304724 | 10/2003 |
| JP | 2008178326 | 8/2008 |
| JP | 2008178327 | 8/2008 |
| WO | 2022016249 | 1/2022 |

OTHER PUBLICATIONS

International Search Report and Written Opinion for PCT Application No. PCT/US2022/014066 dated Apr. 18, 2022 (11 pages).
International Search Report and Written Opinion for PCT Application No. PCT/US2022/014074 dated Jun. 6, 2022 (14 bages).
Notification to Grant the Patent Right and for Transacting Grant Procedures for Chinese Pat. App. No. 202280011387.3, dated Oct. 28, 2025.
Notification of the First Office Action for Chinese Pat. App. No. 202280011387.3, dated Jun. 21, 2025.
Notification of the Second Office Action for Chinese Pat. App. No. 202280011758.8, dated Oct. 25, 2025.
Notification of the First Office Action for Chinese Pat. App. No. 202280011758.8, dated Jun. 21, 2025.
Indian Patent Application No. 202317050111, Examination Report, dated Apr. 17, 2026, 9 pgs.

* cited by examiner

FOLDING LINE DIVIDER FOR A HARVESTING PLATFORM

CROSS-REFERENCE TO RELATED APPLICATION

This application claims the benefit of priority to U.S. Provisional Patent Application No. 63/142,274, filed on Jan. 27, 2021, the disclosure of which is hereby incorporated by reference herein in its entirety for all purposes.

FIELD

The present disclosure generally relates to a cutting and harvesting assembly for agricultural machines, in particular for the harvesting of tall and stalky plants.

BACKGROUND

Several models of agricultural machines and equipment are developed to increase productivity in the harvesting of numerous types of crops. For example, some agricultural machines may be configured for use with so-called tall and stalky crops, such as sugarcane and sweet sorghum. The machines particularly intended for the harvesting of tall and stalky plants are designed and developed to promote the harvesting of this specific type of crop because their intrinsic characteristics require proper conditions for the adequate processing thereof, from cutting to transfer to transshipments and/or trucks.

The machines intended for the harvesting the tall and stalky crops include a chassis designed to support a series of components and mechanisms responsible for cutting, harvesting, conducting, and chopping the cane and/or sorghum into billets, which are then transferred to the transshipments and/or cane and/or sorghum trucks through a lift assembly. Furthermore, this type of agricultural machine has a cutting and harvesting assembly that comprises a number of components, such as line dividers, tipping rollers, base cutting discs, and lift rollers.

In some instances, the cutting and harvesting assembly may be disassembled from the machine to reduce its width and allow the transport thereof within the legal limits. However, the disassembly of these components is not a simple and fast task, requiring tools and technicians with experience to perform these services that, in the end, entail the expenditure of time and efforts which reflect on the costs and productivity of the crops. Accordingly, an improved cutting and harvesting assembly for an agricultural machine and method for operating the cutting and harvesting assembly for the agricultural machine would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a cutting and harvesting assembly for an agricultural machine. The assembly includes a structural frame. A feed roller is operably coupled with the structural frame. A deflector assembly is operably coupled with the structural frame. The deflector assembly includes a deflector plate at least partially laterally outward of the feed roller. The deflector plate is rotatable between a first position and a second position relative to the structural frame.

In some aspects, the present subject matter is directed to a cutting and harvesting assembly for an agricultural machine. The assembly includes a structural frame. A line divider set operably is coupled with the structural frame. The line divider set comprises a pivoting frame and one or more feed rollers operably coupled with the pivoting frame. A deflector assembly is operably coupled with the structural frame. The deflector assembly is rotatable between a first position and a second position relative to the structural frame.

In some aspects, the present subject matter is directed to a method for operating a cutting and harvesting assembly for an agricultural machine is provided herein. The method includes disengaging a fastener operably coupling a link to a structural frame. The method also includes moving the link from a first position to a second position causing a deflector plate operably coupled with the link to move from a first position to a second position. Lastly, the method includes engaging the fastener operably coupling the link to the structural frame to retain the link in the second position.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
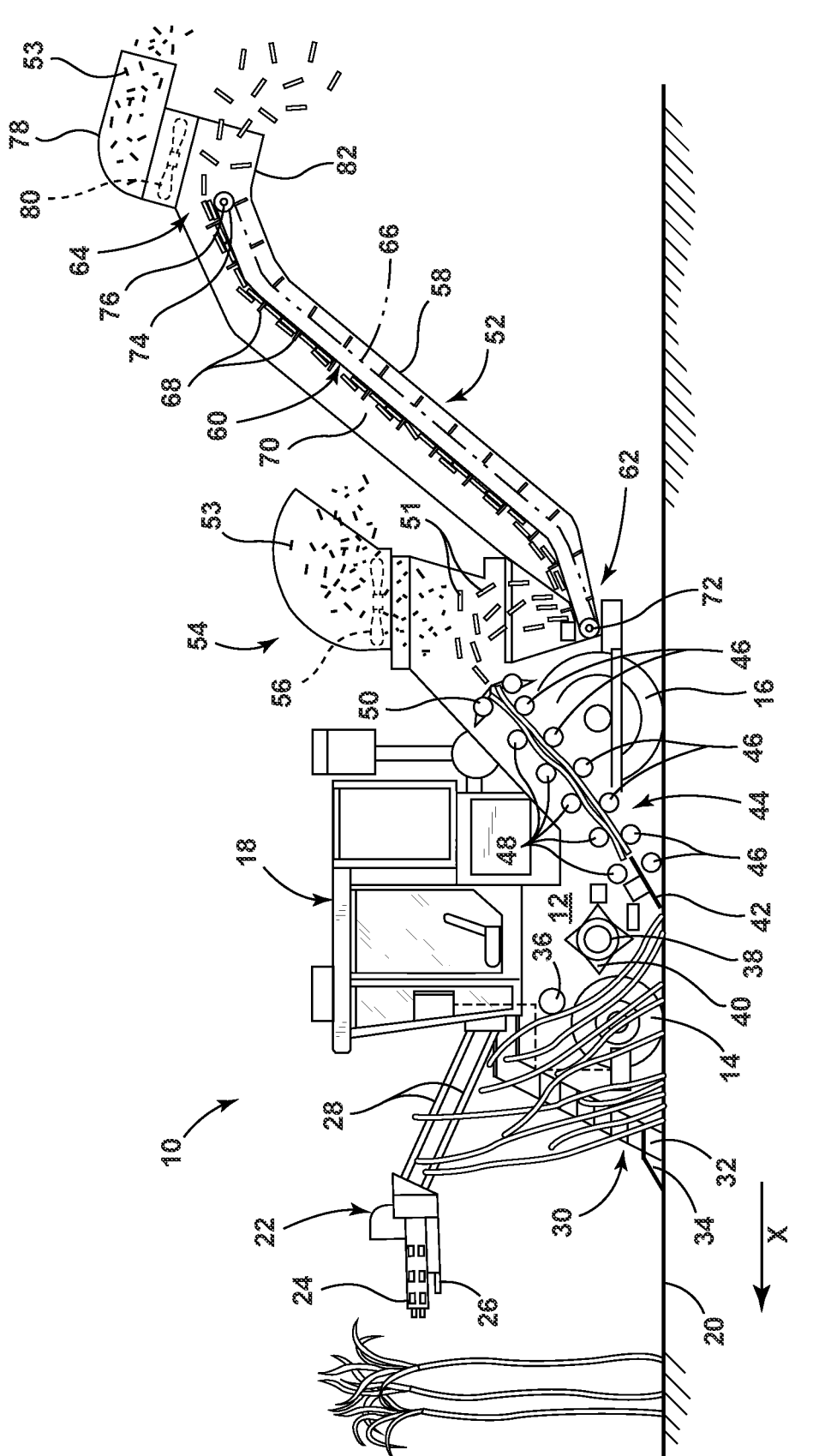
FIG. 1 illustrates a schematic side view of a harvester machine for the harvesting of tall and stalky vegetable crops, such as sugarcane and sorghum, in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product through a system. For example, "upstream" refers to the direction from which an agricultural product moves and "downstream" refers to the direction to which the agricultural product moves. The term "selectively" refers to a component's ability to operate in various states (e.g., an ON state and an OFF state) based on manual and/or automatic control of the component.

The terms "fore" and "aft" refer to relative positions along the agricultural machine relative to a fore-aft axis. The fore direction is a direction along the fore-aft axis that may also be referred to as a forward motion direction of the machine. In addition, an aft direction along the fore-aft is a direction along the fore-aft axis that may also be referred to as a rearward motion direction of the machine. A lateral direction may be defined by a transverse axis that extends between a right side and a left side of the machine and may be perpendicular to the fore-aft axis. As such, any component that is "laterally inward" of another component may be positioned in closer proximity to the fore-aft axis and any component that is "laterally outward" of another component may be positioned in closer proximity to the fore-aft axis along the transverse axis. A longitudinal direction may be defined as a third direction in a three-dimensional plane that is perpendicular to the fore-aft axis and the transverse axis. For example, the height of the machine may be defined in the longitudinal direction.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a cutting and harvesting assembly for an agricultural machine and a method for operating the cutting and harvesting assembly. The cutting and harvesting assembly provided herein may be formed by at least two sets of line dividers arranged along a structural frame. Each line divider set includes a respective pivoting frame. The cutting and harvesting assembly provided herein enables the width of agricultural machines of tall and stalky plants to be reduced without the need to disassemble the frontal components of the machine that restrict the circulation thereof on roads during transport. In addition, the cutting and harvesting assembly for the agricultural machine manages to simplify and optimize the transport process of the agricultural machine and, thereby, obtain practical logistics results that may ultimately provide significant results in productivity in the harvesting processes, in view of the time and effort required to put these machines into operation in the fields.

In some examples, the cutting and harvesting assembly may include a structural frame. A line divider set may be operably coupled with the structural frame. The line divider set can include a pivoting frame and one or more feed rollers operably coupled with the pivoting frame. A deflector assembly can be operably coupled with the structural frame. The deflector assembly may be rotatable between a first position and a second position relative to the structural frame.

With each of the line divider set and/or the deflector assembly being movable between a first position and a second position, the total width of the cutting and harvesting assembly may be reduced. As used herein, the total width of the cutting and harvesting assembly may be defined by a distance between outermost lateral components of the cutting and harvesting assembly.

Referring now to FIG. 1, a side view of an agricultural machine 10 is illustrated in accordance with various aspects of the present disclosure. As illustrated, the agricultural machine 10 is configured as a sugarcane harvester. However, in other examples, the agricultural machine 10 can correspond to any suitable agricultural harvester without departing from the scope of the present disclosure.

As shown in FIG. 1, the agricultural machine 10 includes a chassis 12, a pair of front wheels 14, a pair of rear wheels 16, and an operator cab 18. The agricultural machine 10 may also include a primary power source (e.g. an engine mounted on the chassis 12) that energizes one or both pairs of wheels 14, 16 through a transmission. Alternatively, the agricultural machine 10 can be a harvester driven on belts and therefore may include belts driven by the primary power source in place of the illustrated wheels 14, 16. The primary power source can also drive a hydraulic fluid pump arranged to generate pressurized hydraulic fluid to drive various hydraulic components of the agricultural machine 10.

Additionally, the agricultural machine 10 can include various components for cutting, processing, cleaning, and unloading sugarcane as the cane is harvested from an agricultural field 20. For example, the agricultural machine 10 may include a tip cutter assembly 22 positioned at its front end to intercept sugarcane as the agricultural machine 10 is moved in the forward direction represented by arrow X. As shown, the tip cutter assembly 22 can include both a binder disc 24 and a cutter disc 26. The binder disc 24 can be arranged to gather crop stalks so that the cutter disc 26 can be used to cut the tip of each stalk. In various examples, the height of the tip cutter assembly 22 can be adjustable by a pair of arms 28, which may be hydraulically raised and lowered.

Additionally, the agricultural machine 10 may include a harvesting assembly 100 that can include one or more line divider sets 30 that extend up and back from the field 20. In general, the one or more line divider sets 30 can include spiral feed rollers 32, each of which may also be known as a "lollipop." Each feed roller 32 can include a ground plate 34 since its lower end assists the one or more line divider sets 30 by dividing the crop stalks for harvesting. In addition, as shown in FIG. 1, the agricultural machine 10 may include a tipping roller 36 positioned near the front wheels 14 and a roll with projections 38 positioned behind the tipping roller 36. As the tipping roller 36 is rotated, the harvested crop stalks are tipped while the line divider set 30 gathers the stalks from the agricultural field 20 towards the inside of the machine 10. Additionally, as shown in FIG. 1, the roll with projections 38 may include a plurality of intermittently mounted fins 40 that assist in forcing the crop stalks down. As the roll 38 is rotated during harvest, the crop stalks that have been tipped by the tipping roller 36 are separated and subsequently tipped by the roll 38 as the agricultural machine 10 continues to be moved forward with respect to the field 20.

With further reference to FIG. 1, the agricultural machine 10 can also include a base cutting set 42 positioned behind the roll 38. In general, the base cutting set 42 may include blades for cutting the crop stalks as the cane is harvested. The blades, located on the periphery of the base cutting set 42, can be rotated by a hydraulic motor driven, for example, by the vehicle's hydraulic system. Additionally, in several embodiments, the blades can be angled down to cut the base of the sugarcane as the cane is tipped by the roll 38.

As will be appreciated by persons skilled in the art, these components, and mechanisms, which may form the cutting and harvesting assembly 100 of the machine 10, can be mounted directly on the structure of the chassis 12, or also on an independent front platform thereby allowing the exchange and replacement of these elements for the proper adequacy and configuration of the machine 10 to the specificities of the crop that is intended to be harvested in the field 20.

In addition, the agricultural machine 10 can include a set of one or more conveyor rollers 44 located downstream of the base cutting set 42 to move the cut crop stalks from the base cutting set 42 along the processing path. As shown in FIG. 1, the conveyor roller assembly 44 can include a plurality of lower rollers 46 and a plurality of upper rollers 48. As sugarcane is transported through the conveyor roller assembly 44, waste (e.g. stones, dirt, and/or the like) can also be transported or fall through the lower rollers 46 onto the field 20.

Additionally, the agricultural machine 10 may include a chipper set 50 located at the downstream end of the transport roller assembly 44 (e.g. adjacent to the rearmost lower and upper rollers 46, 48). In general, the chipper set 50 can be used to cut or chop the harvested crop stalks into smaller pieces or "fragments" 51 that can, for example, measure 15.24 centimeters (six inches), and may also be referred to as billets. The fragments 51 can then be propelled in the direction of a lift assembly 52 of the agricultural machine 10 to be collected on an external receiver or storage device.

In general, pieces of waste 53 (e.g. dust, subject, leaves, etc.) separated from the sugarcane the fragments 51 can be expelled from the agricultural machine 10 through a primary waste extractor set 54, which is located behind the chipper set 50 and is oriented to direct waste 53 out of the agricultural machine 10. Additionally, a fan 56 can be mounted on the primary extractor 54 to generate a suction force or vacuum sufficient to capture the waste 53 and force the waste 53 through the primary extractor 54. The waste 53 is then directed out and usually in the opposite direction of the agricultural machine 10 by through an outlet of the primary extractor 54. The fragments 51 that are separated and heavier than the waste 53 being expelled from the extractor 54, can then fall into the lift assembly 52.

As shown in FIG. 1, the lift assembly 52 may generally include a lift housing 58 and a lift 60 that extends into the lift housing 58 between a lower proximal end 62 and an upper distal end 64. In general, the lift 60 may include a chain or conveyor belt 66 and a plurality of paddles or protrusions 68 coupled or evenly spaced in the chain 66. The protrusions 68 can be arranged to hold the sugarcane the fragments 51 in the lift 60 as the fragments 51 are raised towards the top of the lift 70. Additionally, the lift 60 can include lower and upper sprockets 72, 74 positioned around the proximal and distal extremities 62, 64, respectively. As shown in FIG. 1, a lift motor 76 can be coupled to one of the sprockets (e.g. the upper sprocket 74) to drive the chain 66, thus allowing the chain 66 and the protrusions 68 to move in an endless cycle between the proximal and distal extremities 62, 64 of the lift 60.

In addition, pieces of waste 53 (e.g. dust, dirt, leaves, etc.) separated from sugarcane the fragments 51 can be expelled from the agricultural machine 10 through a secondary waste extractor assembly 78 coupled to the rear end of the lift 58. As shown in FIG. 1, the secondary extractor assembly 78 can be located adjacent to the distal end 64 of lift 60 and can be oriented to direct the waste 53 out of the agricultural machine 10. Additionally, a fan 80 can be mounted on the secondary extractor 78 to generate a suction force or vacuum sufficient to extract the waste 53 and force the waste 53 through the secondary extractor 78. The fragments 51 that are separated and heavier than the waste 53 expelled through extractor 78, can then fall from the distal end 64 of the lift 60. Typically, the fragments 51 can fall through a discharge opening 82 of the lift assembly 52 into an external storage device, such as a car, transshipment, dumpster, etc.

During operation, the agricultural machine 10 is driven throughout the agricultural field 20 to harvest sugarcane. Once the height of the tip cutter 22 is adjusted (if used) by the arms 28, the binder disc 24 in the tip cutter assembly 22 can work in such a way as to clump the sugarcane tips as the agricultural machine 10 proceeds through the field 20, while the cutter disc 26 cuts the leafy tips of the crop stalks to discharge them along both sides of the agricultural machine 10. As the stalks enter the one or more line divider sets 30, the plates 34 can arrange the width of the operation to determine the amount of sugarcane entering an inlet opening of the agricultural machine 10, either fixedly or adjustably. The lollipops 32 then gather the stalks at the machine inlet to allow the tipping roller 36 to bend the stalks down together with the action of the roller with fins 38. Once the stalks are positioned at an angle, as shown in FIG. 1, the base cutting set 42 can then cut the base of the stalks from the field 20. The cut stalks are then directed to the conveyor roll assembly 44.

The cut stalks of sugarcane are transported backwards by the conveyor rolls 46, 48, which compress the stalks and harvested matter. At the downstream end of the conveyor roller assembly 44, the chipper set 50 cuts or chops the compacted crop stalks into pieces or the fragments 51. Waste transported 53 (e.g. dust, dirt, leaves, etc.) separated from sugarcane the fragments 51 are then extracted through the primary waste extractor assembly 54 using the suction or vacuum created by fan 56. The separated/washed the fragments 51 then fall to the lift assembly 52 and travel upward by way of the lift 60 from its proximal end 62 to the distal end 64. During normal operation, once the fragments 51 reach the distal end 64 of the lift 60, the fragments 51 fall through the discharge opening 82 to an external storage device. Similar to the primary extractor 54, waste is blown out of the agricultural machine 10 through the secondary waste extractor assembly 78 with the help of the fan 80.

Additionally, although the drawings represent a frontal structure arranged for the harvesting of two planting lines and, therefore, composed with the frontal elements in duplicate, as will be appreciated by persons skilled in the art, the cutting and harvesting assembly 100 can be arranged to perform the harvest in only one planting line or multiple planting lines, varying according to the interests of projects and market demands, without interfering with the scope of the present disclosure.

Also, although the figures represent the cutting and harvesting assembly 100 as an independent platform, as previously indicated, the cutting and harvesting assembly 100 can additionally or alternatively be mounted directly on the chassis 12 of the machine 10.

Referring now to FIGS. 2-9B, the cutting and harvesting assembly 100 is illustrated in accordance with various aspects of the present disclosure. As illustrated, the harvesting assembly 100 can include a structural frame 102 on which are installed the one or more line divider sets 30 for separation and direction of the crop stalks for harvesting. Furthermore, the cutting and harvesting assembly 100 can include at least one tipping roller 36 arranged upstream of the base cutting set 42, which is formed by a drive box 104 from which rotating shafts 106 are projected and whose ends support base cutting discs 108 provided with blades to cut the crop (e.g., sugarcane and/or sorghum) stalks as the harvest is carried out along the field 20.

In the examples illustrated in FIGS. 2-9B, the cutting and harvesting assembly 100 may be configured as a multi-row harvester, and accordingly, can include a central portion divider set 30, a first line divider set 30, and a second line divider set 30. In some examples, the central portion divider may include one or more central portion feed rollers 32 operably coupled with a central portion frame 118. The first line divider set 30 may include one or more feed rollers 32 and one or more plates 34 that are operably coupled with a first pivoting frame 110. Similarly, the second line divider set 30 may include one or more feed rollers 32 and one or more plates 34 that are operably coupled with a second pivoting frame 114.

In some instances, the first line divider set 30 includes a pair of feed rollers 32 operably coupled with the first pivoting frame 110. The pair of feed rollers 32 may be positioned laterally outward of the one or more central portion feed rollers 32. A first opening 120 may be defined between the one or more central portion feed rollers 32 and the feed rollers 32 operably coupled with the first pivoting frame 110 for separation and direction of the crop stalks for harvesting.

Figure 2:
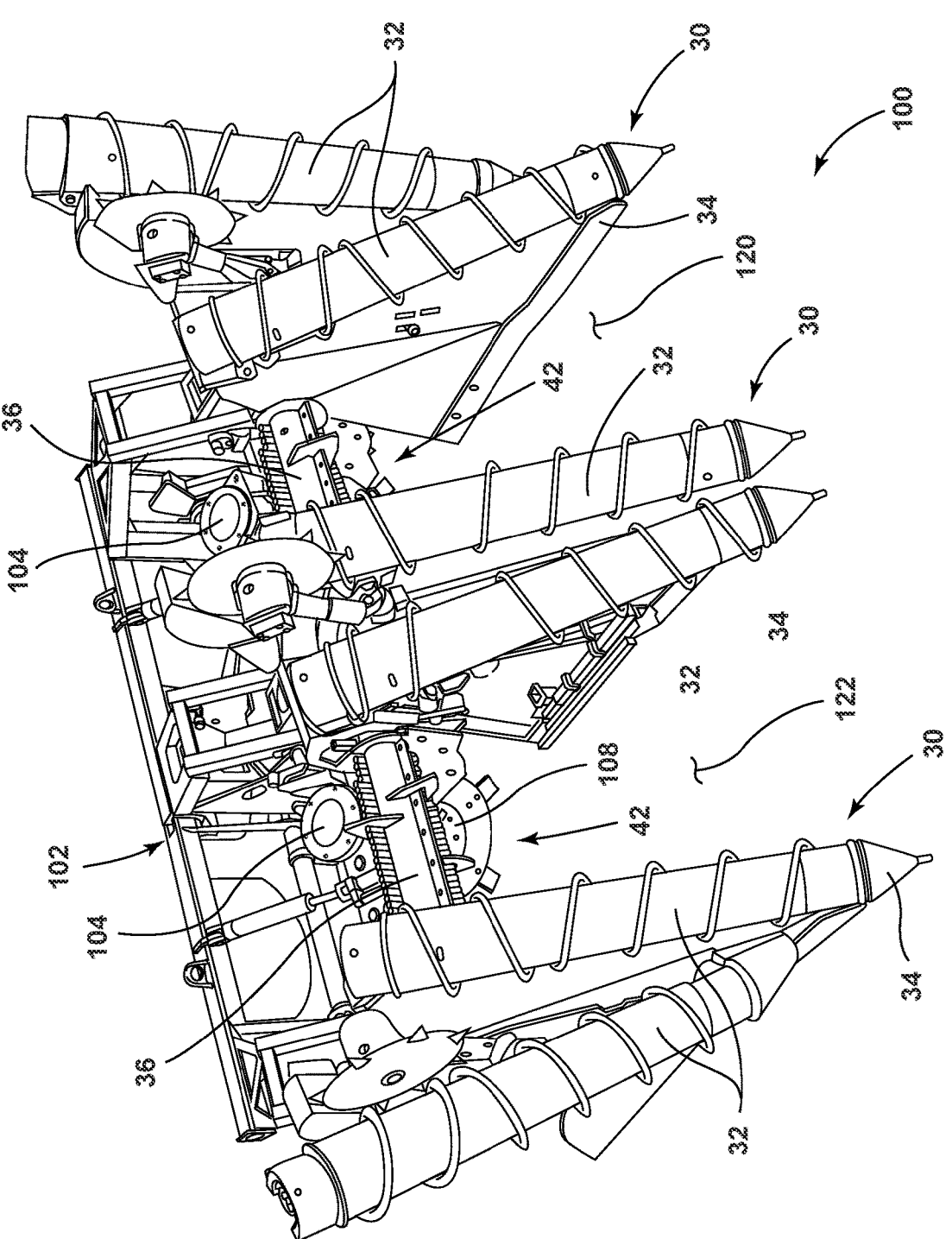
FIG. 2 is an isolated perspective view of the cutting and harvesting assembly of a sugarcane and/or sorghum agricultural machine in accordance with aspects of the present subject matter.
Figure 3:
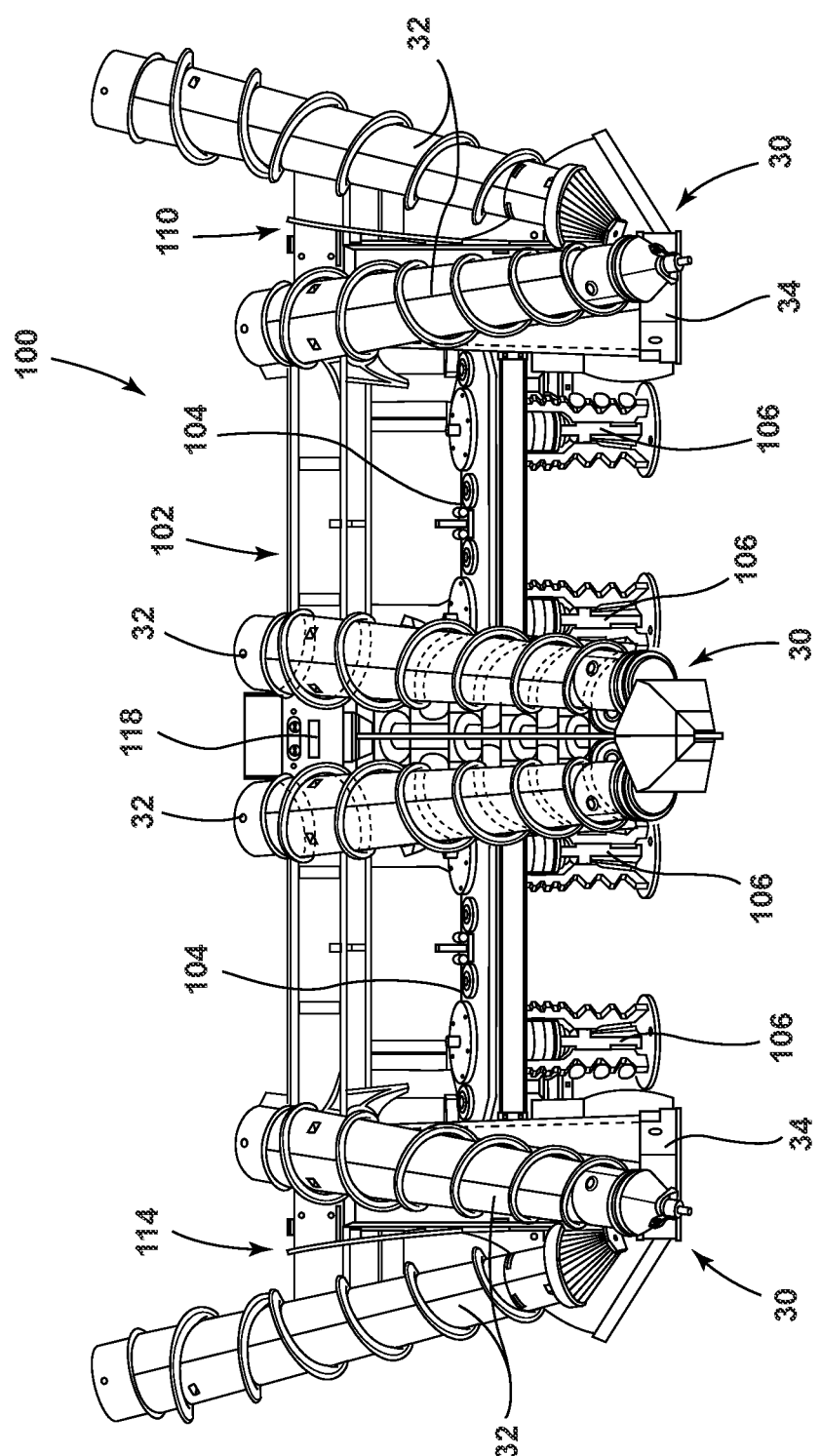
FIG. 3 is a front view of the cutting and harvesting assembly of a harvester machine with the line divider sets in the working or open position in accordance with aspects of the present subject matter.
Figure 4A:
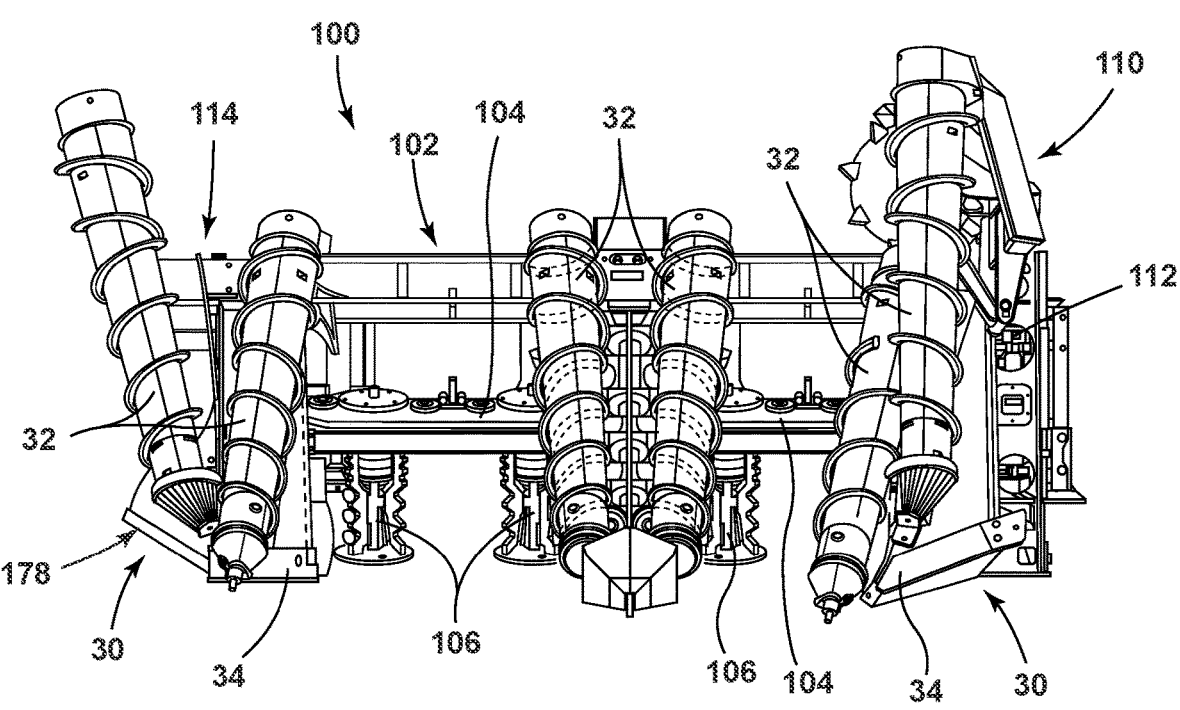
FIGS. 4A and 4B are front and top views of the cutting and harvesting assembly represented in FIG. 3 with one of the line divider sets pivoted in accordance with aspects of the present subject matter.
Figure 4B:
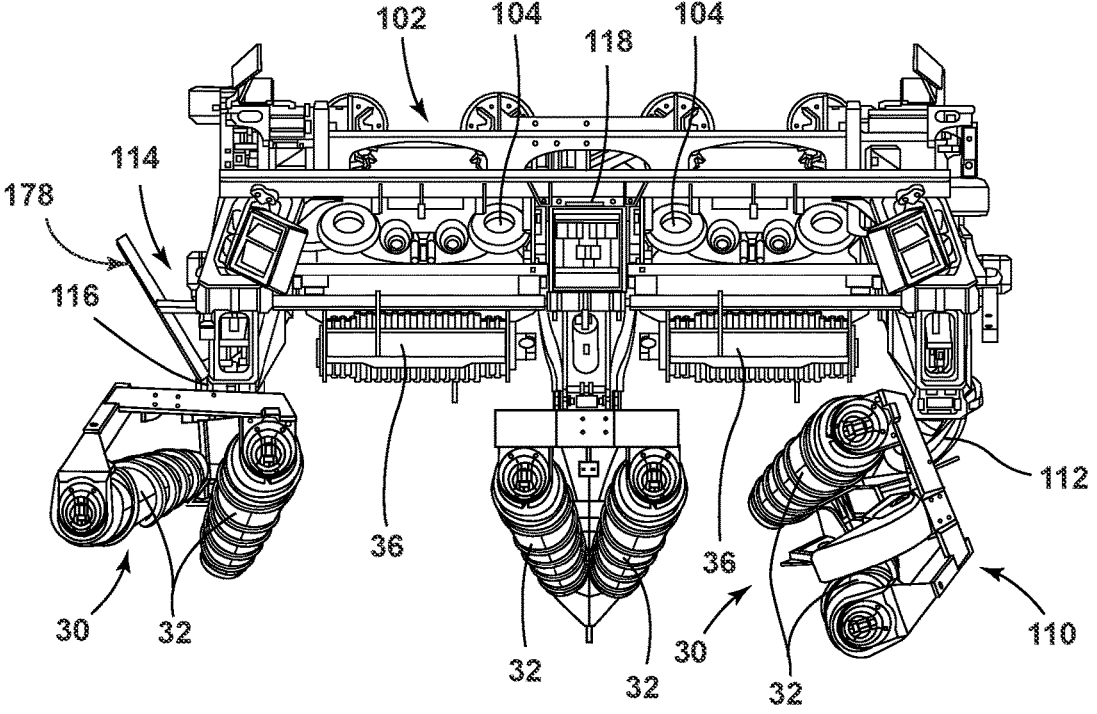
Figure 5A:
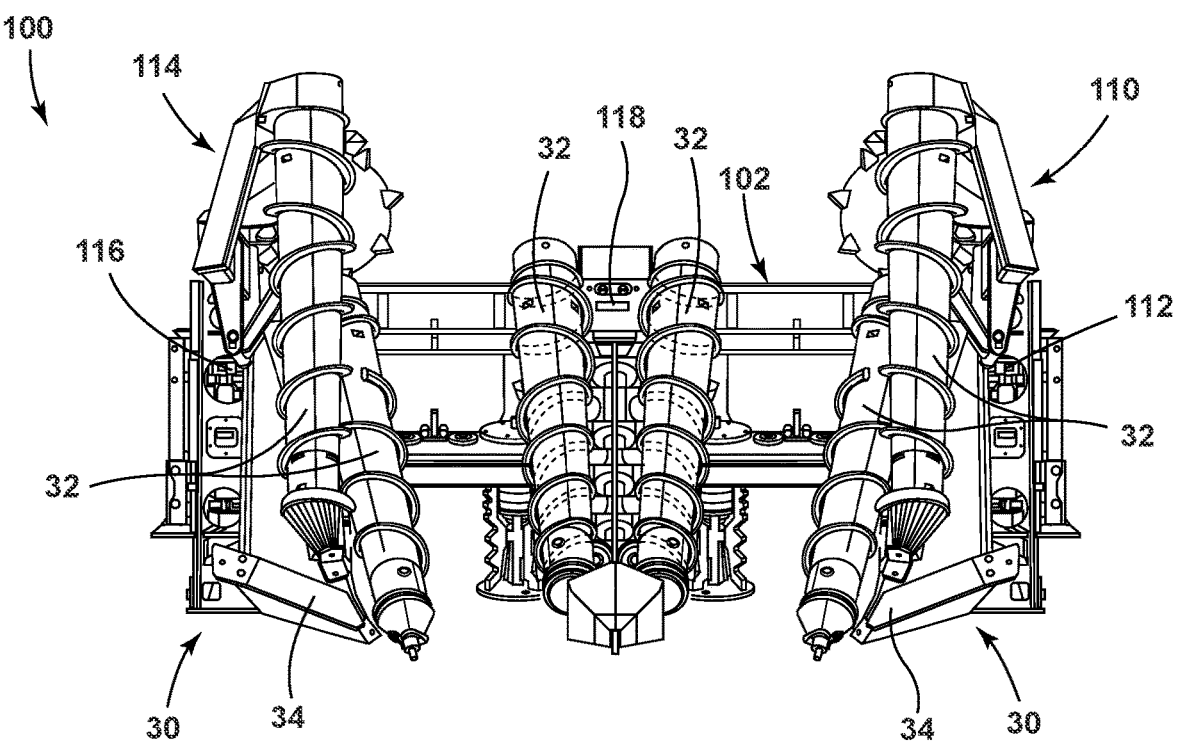
FIGS. 5A and 5B are respective front and top views of the cutting and harvesting assembly represented in FIG. 3 with the two end line divider sets pivoted in accordance with aspects of the present subject matter.
Figure 5B:
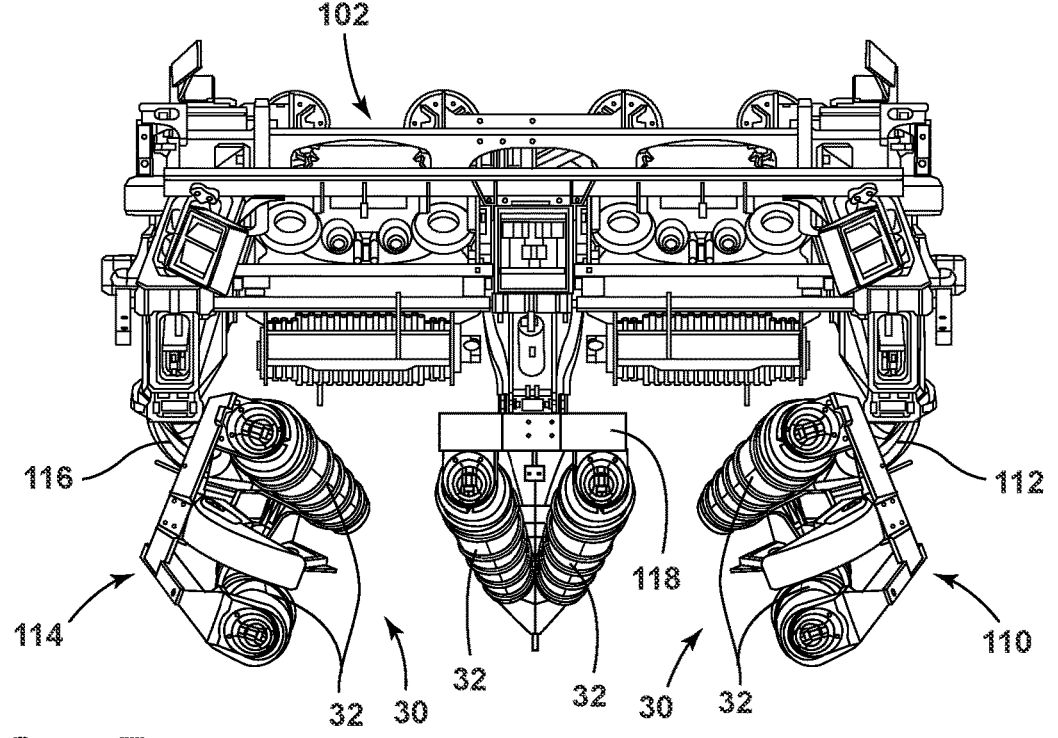
Figure 6A:
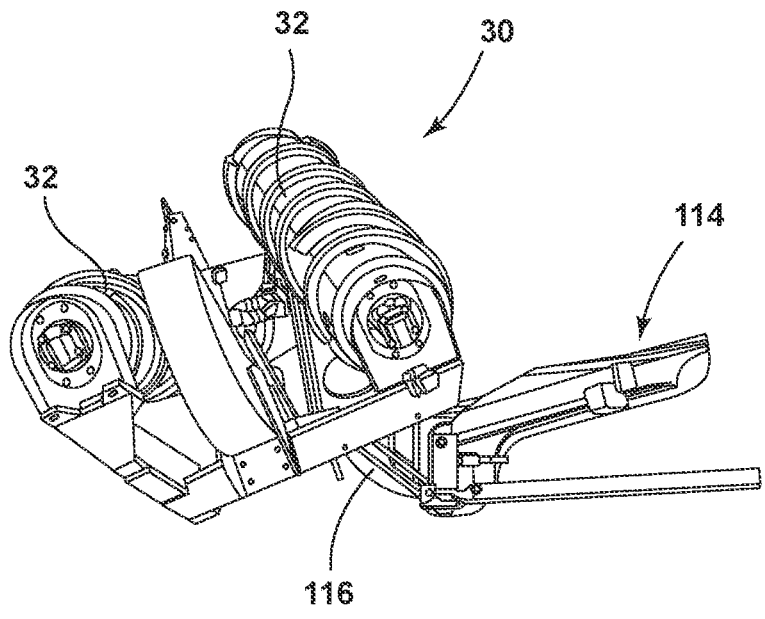
FIGS. 6A and 6B are respective top and bottom views of one of the pivoted line divider sets in accordance with aspects of the present subject matter.
Figure 6B:
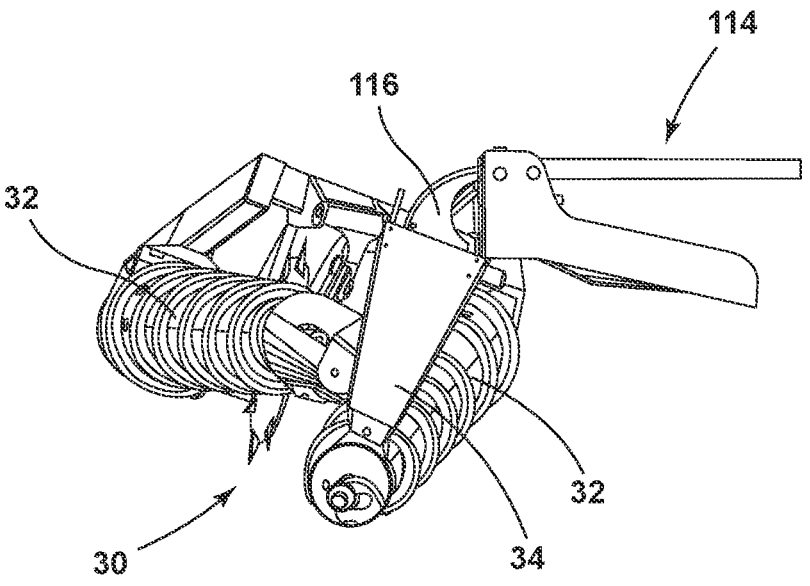
Figure 7A:
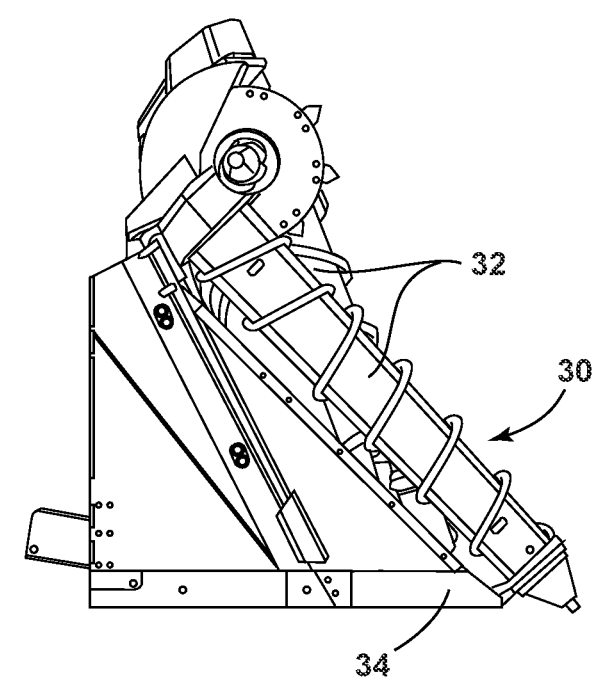
FIGS. 7A and 7B are internal side views of one of the line divider sets in the working or open position, and in the transport or pivoted position, respectively, in accordance with aspects of the present subject matter.
Figure 7B:
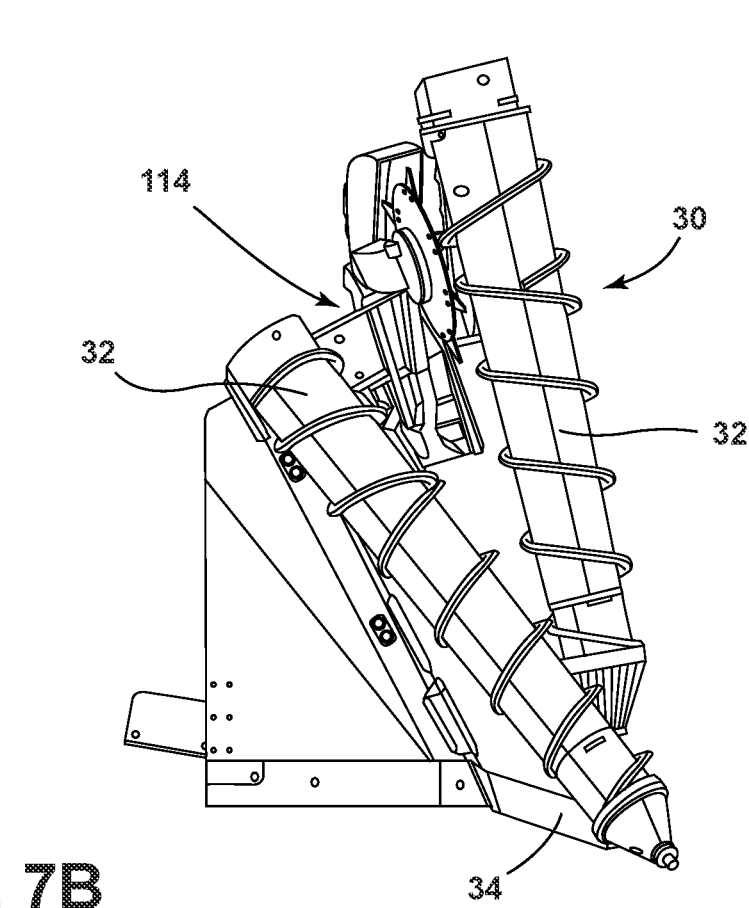
Figure 8A:
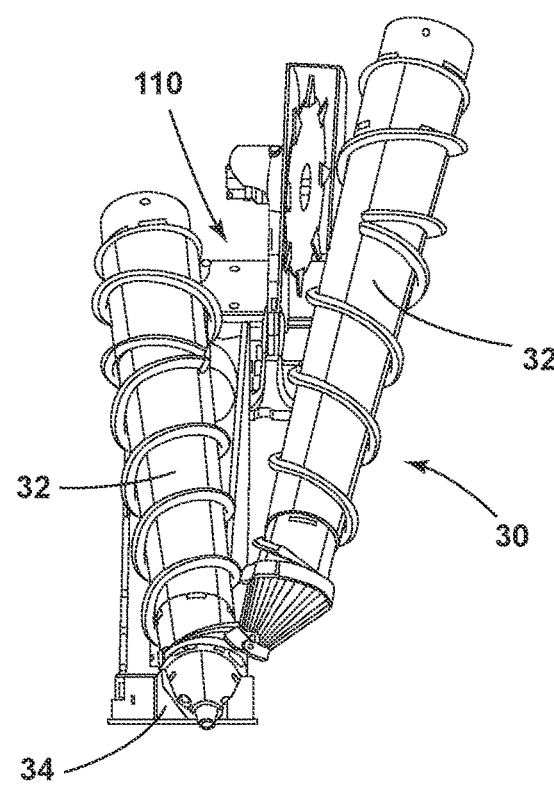
FIGS. 8A and 8B are front views of one of the line divider sets in the working or open position, and in the transport or pivoted position, respectively, in accordance with aspects of the present subject matter.
Figure 8B:
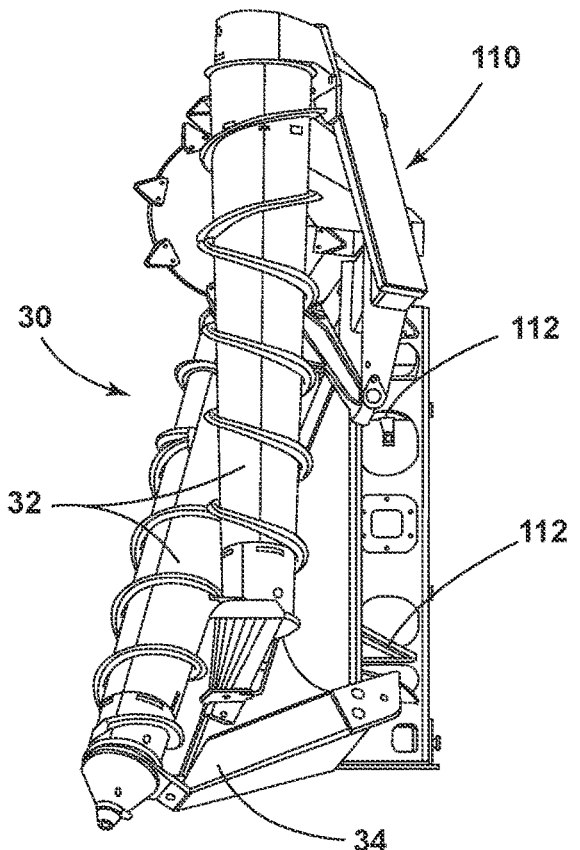
Figure 9A:
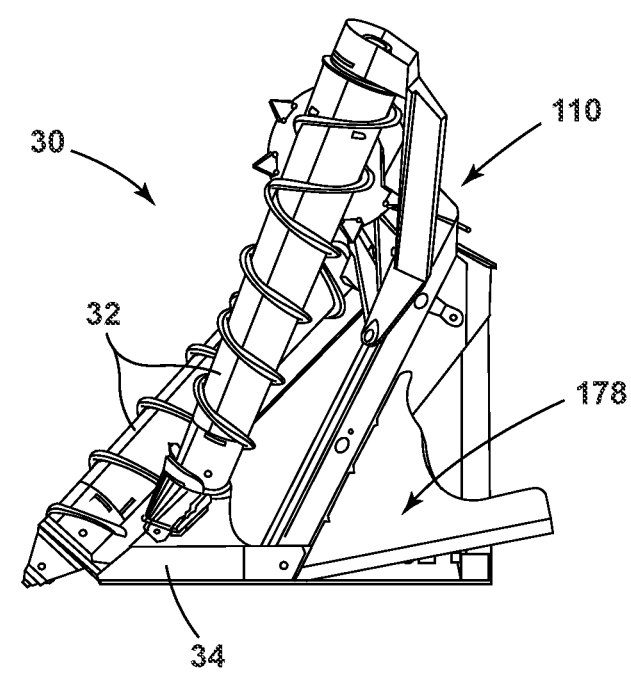
FIGS. 9A and 9B are external side views of one of the line divider sets in the working or open position, and in the transport or pivoted position, respectively, in accordance with aspects of the present subject matter.
Figure 9B:
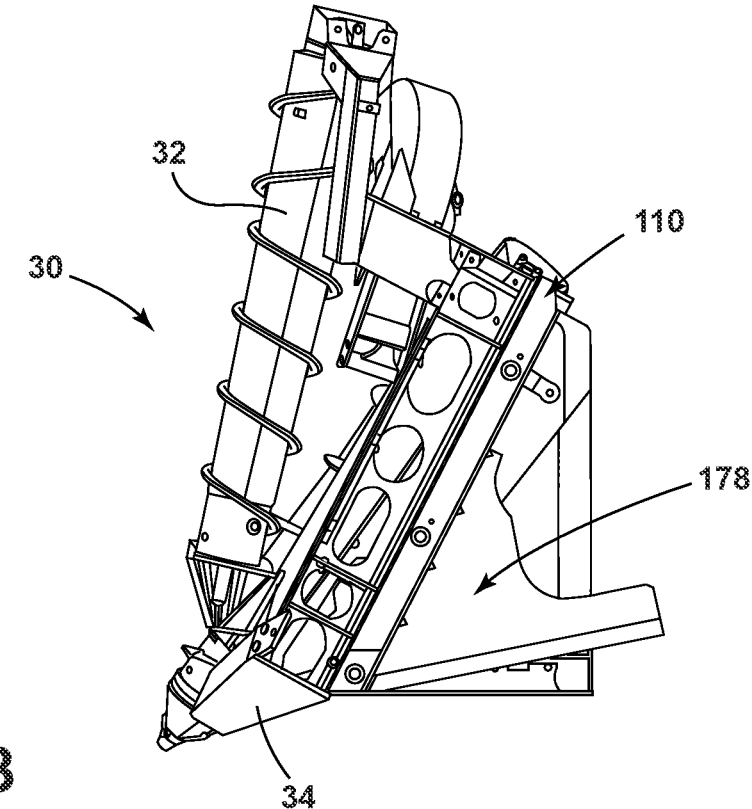
Figure 10:
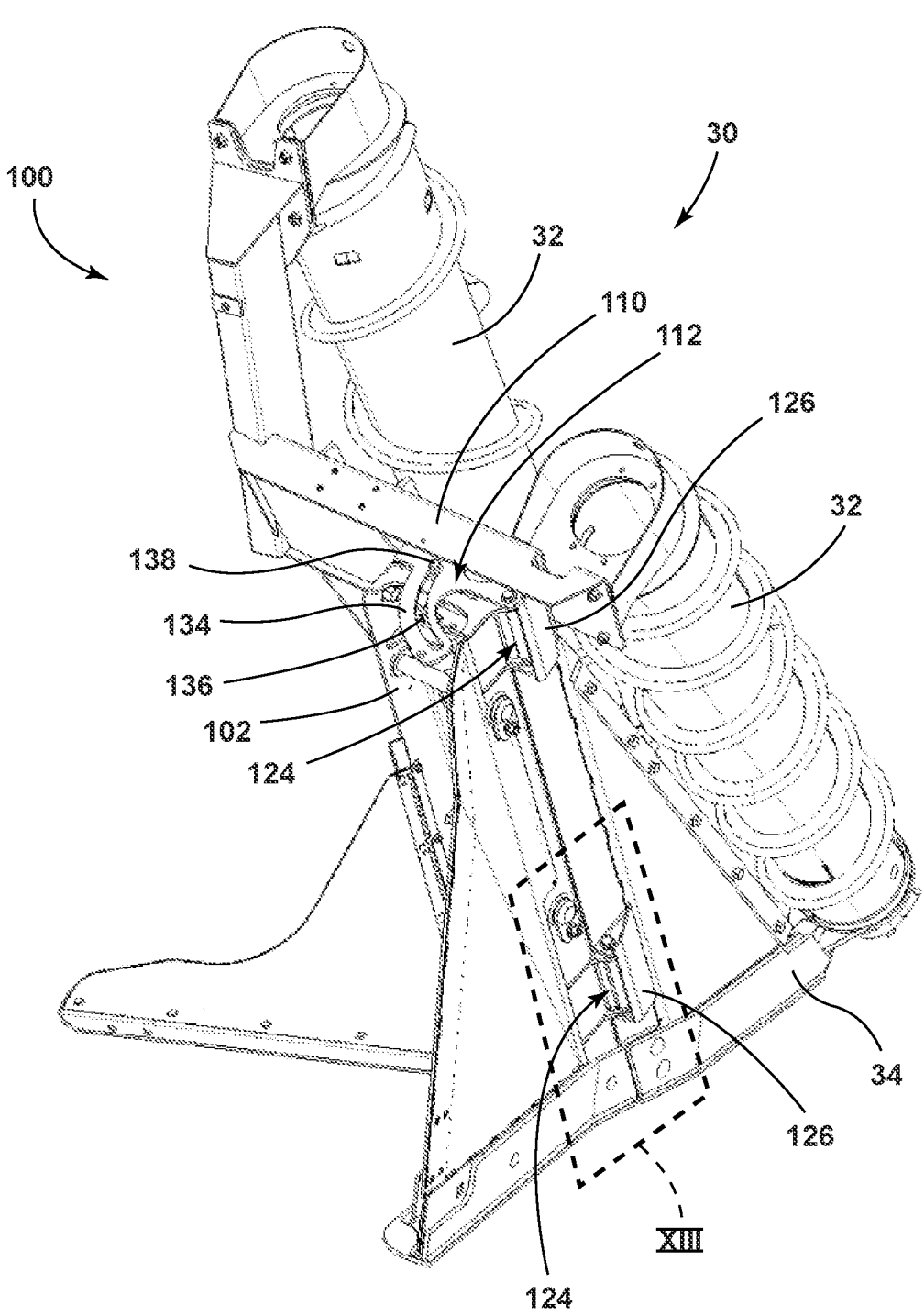
FIG. 10 is a side perspective view of the first line divider set in a first position in accordance with aspects of the present subject matter.
Figure 11:
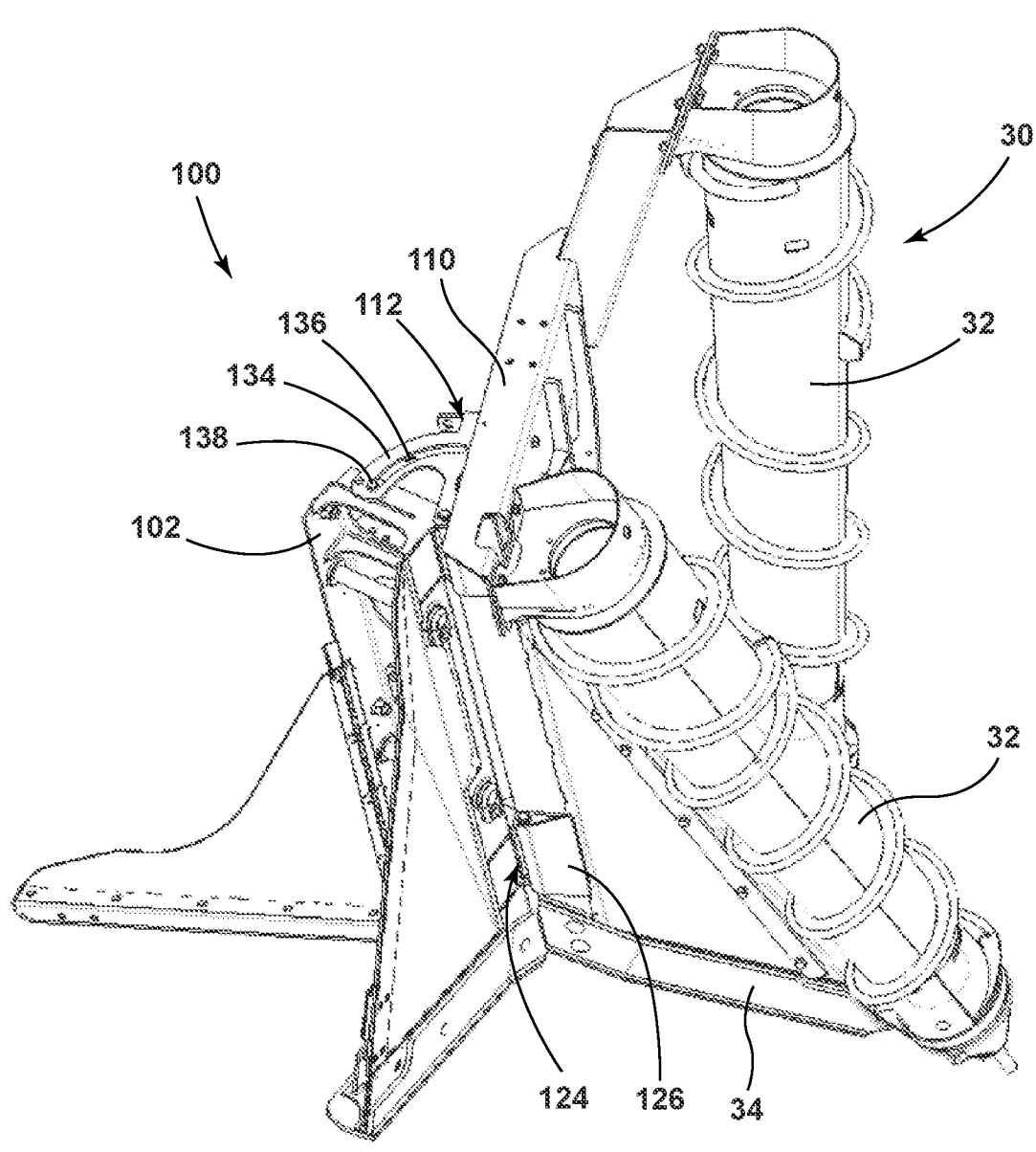
FIG. 11 is a side perspective view of the first line divider set in a second position in accordance with aspects of the present subject matter.
Figure 12:
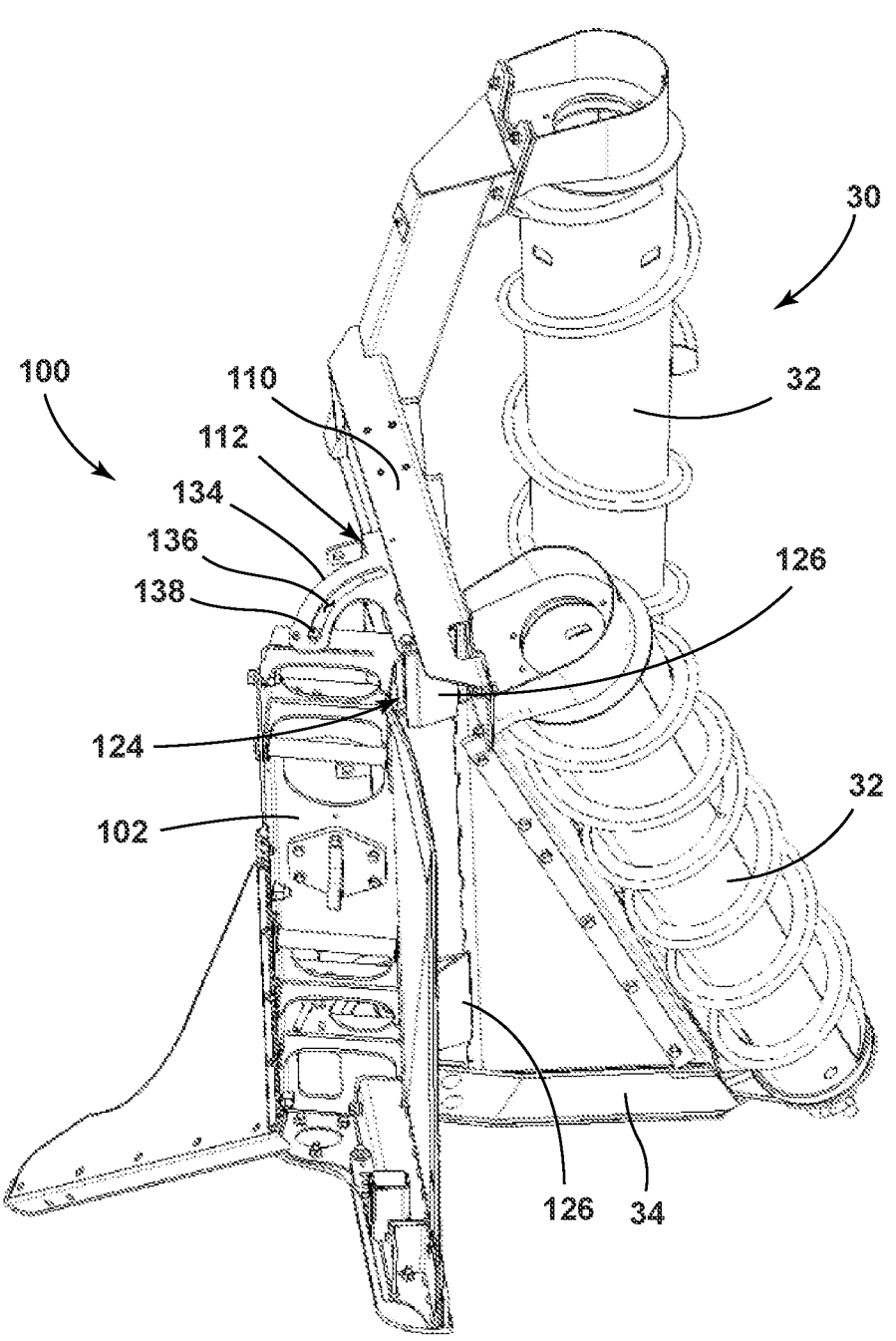
FIG. 12 is a rear perspective view of the first line divider set in the second position in accordance with aspects of the present subject matter.
Figure 13:
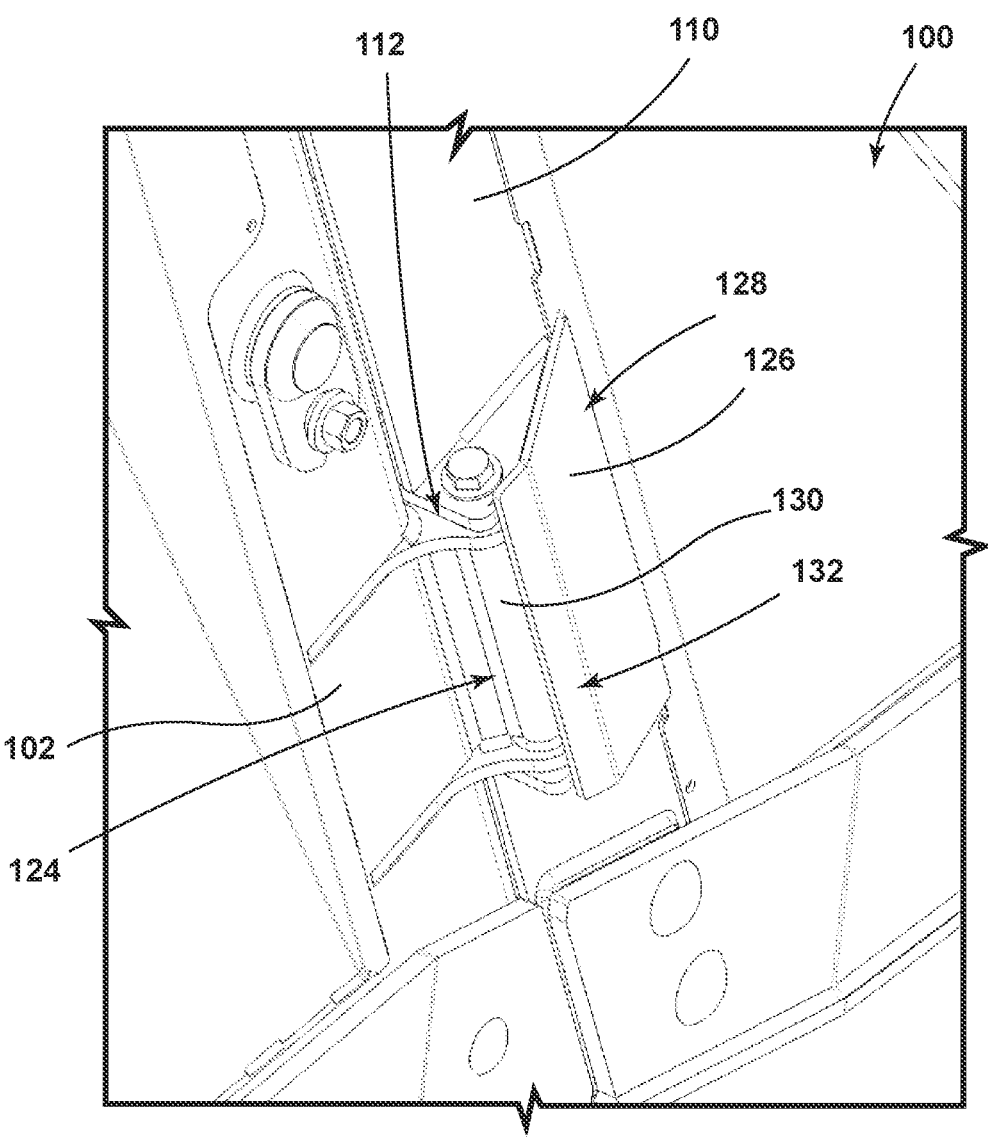
FIG. 13 is an enhanced view of area XIII of FIG. 10.
Figure 14:
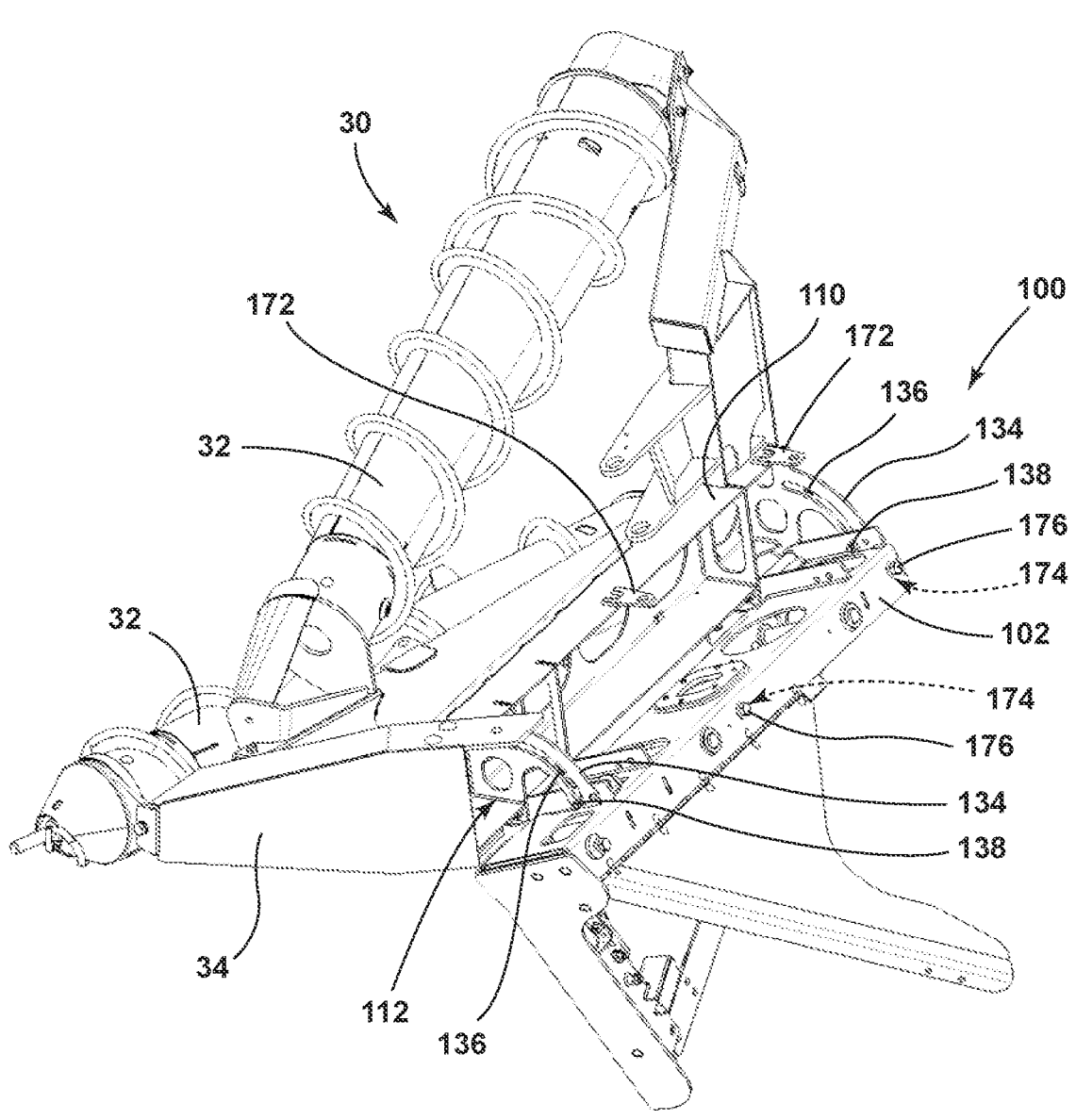
FIG. 14 is a bottom perspective view of the first line divider set in the second position in accordance with aspects of the present subject matter.
Figure 15:
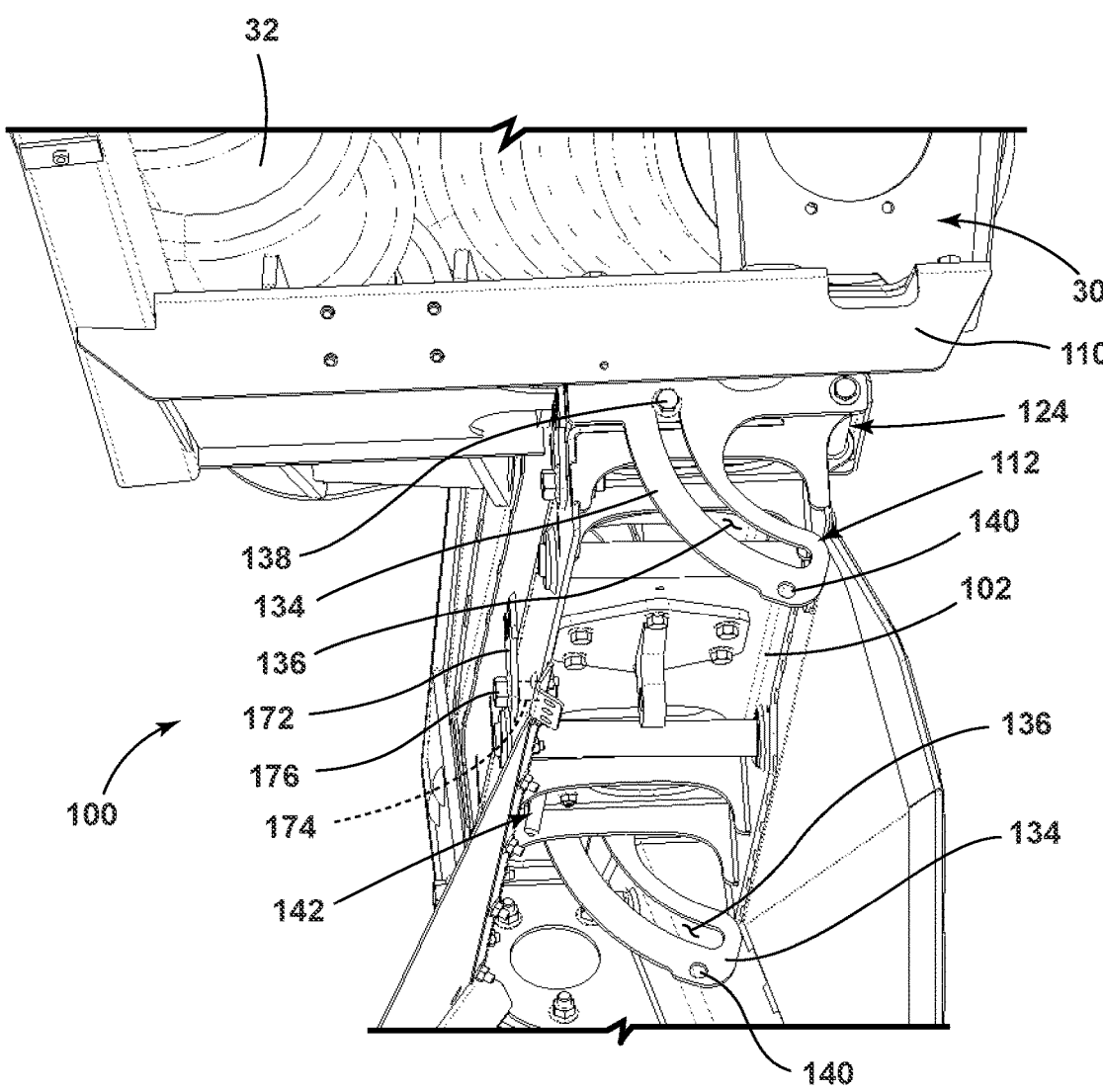
FIG. 15 is a top perspective view of the first line divider set in the first position in accordance with aspects of the present subject matter.
Figure 16:
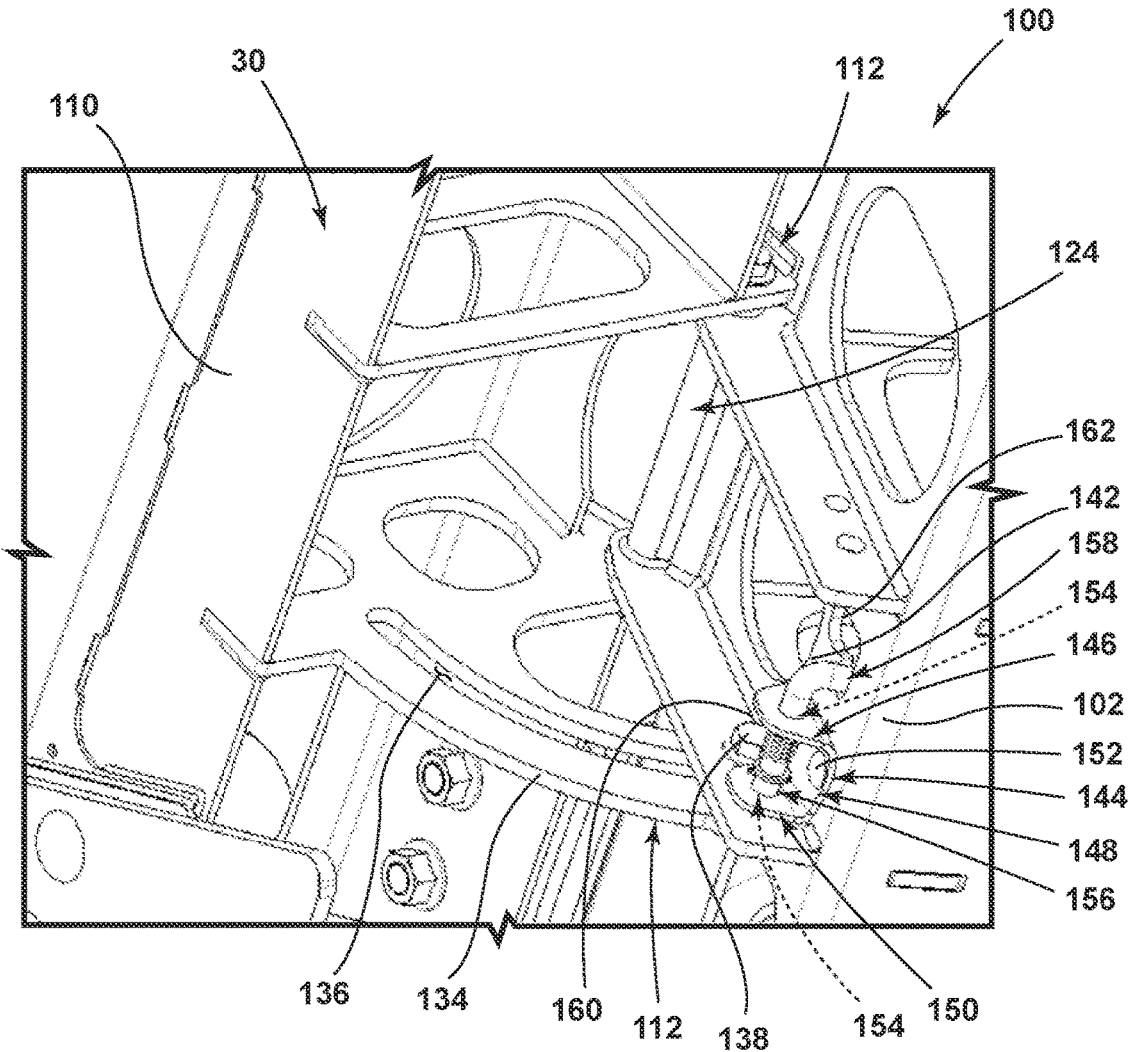
FIG. 16 is a side perspective view of the first line divider set in the second position in accordance with aspects of the present subject matter.
Figure 17:
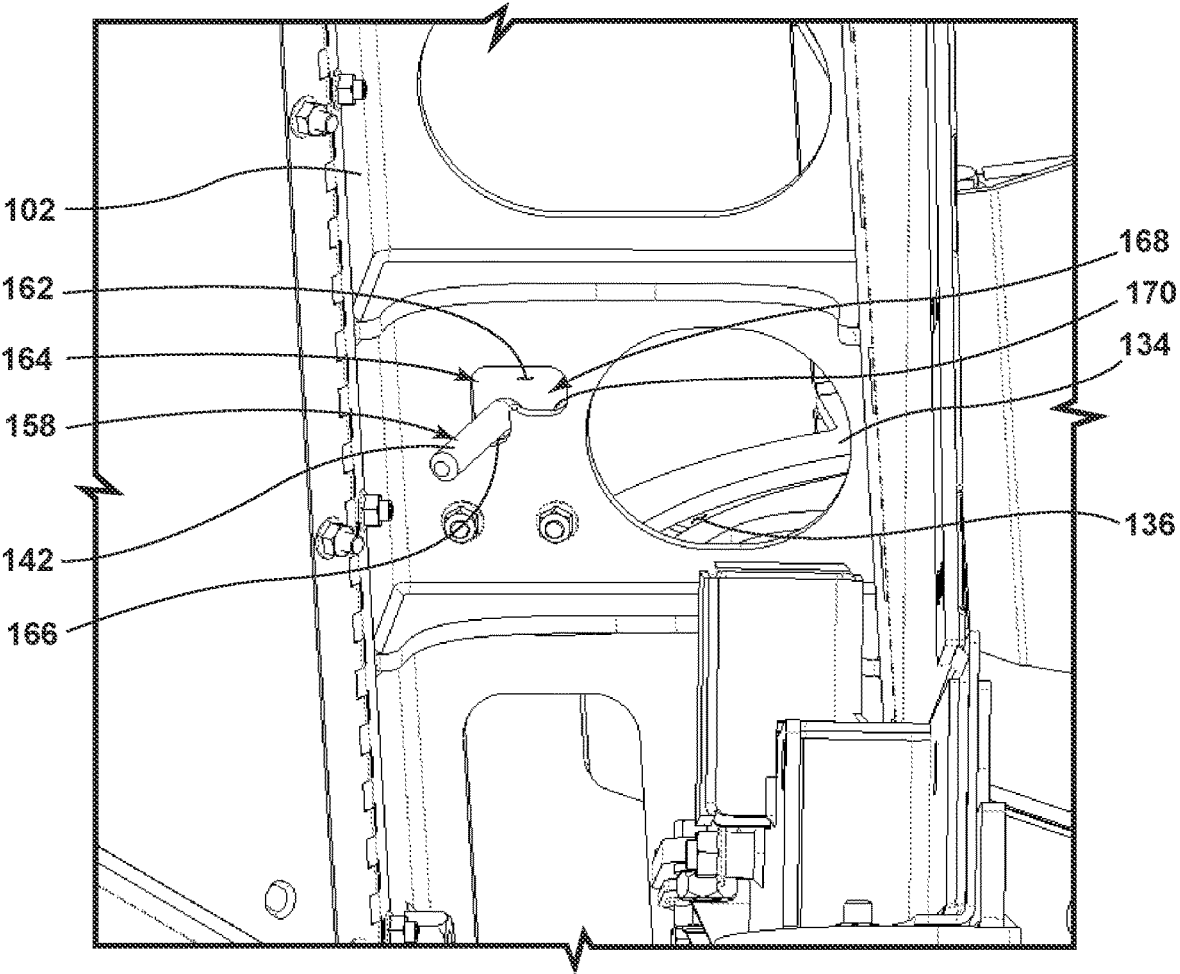
FIG. 17 is a rear perspective view of a structural frame and the first line divider set in accordance with aspects of the present subject matter.

In various examples, the first pivoting frame 110 may be movable between at least a first, operational position, as illustrated in FIG. 2, and a second, storage position, as illustrated in FIG. 5A. In such examples, the one or more central portion feed rollers 32 is a first distance from either one of the pair of feed rollers 32 operably coupled with the first pivoting frame 110 when the first pivoting frame 110 is in the first position. Additionally, the one or more central portion feed rollers 32 is a second, smaller distance from either one of the pair of feed rollers 32 operably coupled with the first pivoting frame 110 when the first pivoting frame 110 is in the second position. As such, the first opening 120 may have a first width when the first pivoting frame 110 is placed in the first, operational position and a second, smaller width when the first pivoting frame 110 is placed in the second, storage position.

In some instances, the second line divider set 30 is positioned on an opposing side of the central portion divider set from the first line divider set 30 and operably coupled with the structural frame 102. The second line divider set 30 can include a pair of feed rollers 32 operably coupled with the second pivoting frame 114. A second opening 122 may be defined between the one or more central portion feed rollers 32 and the feed rollers 32 operably coupled with the second pivoting frame 114 for separation and direction of the crop stalks for harvesting.

In various examples, the second pivoting frame 114 may be movable between at least a first, operational position, as illustrated in FIG. 2, and a second, storage position, as illustrated in FIG. 5A. In such examples, the one or more central portion feed rollers 32 is a first distance from either one of the pair of feed rollers 32 operably coupled with the second pivoting frame 114 when the second pivoting frame 114 is in the first position. Additionally, the one or more central portion feed rollers 32 is a second, smaller distance from either one of the pair of feed rollers 32 operably coupled with the second pivoting frame 114 when the second pivoting frame 114 is in the second position. As such, the second opening 122 may have a first width when the second pivoting frame 114 is placed in the first, operational position and a second, smaller width when the second pivoting frame 114 is placed in the second, storage position.

In various examples, the plates 34 associated with each of the feed rollers 32 within the first line divider set 30 may be configured to move with the first pivoting frame 110 as the first pivoting frame 110 is moved between the first position and the second position. Likewise, the plates 34 associated with each of the feed rollers 32 within the second line divider set 30 may be configured to move with the second pivoting frame 114 as the second pivoting frame 114 is moved between the first position and the second position.

Referring further to FIGS. 2-9B, in the illustrated examples, the first pivoting frame 110 may be operably coupled with the structural frame 102 through a first connection element 112. Similarly, the second pivoting frame 114 may be operably coupled with the structural frame 102 through a second connection element 116. Each of the first connection element 112 and the second connection element 116 may be of any geometry. In addition, the first connection element 112 may be integrally formed with or later attached to the first pivoting frame 110 and/or movable with the first pivoting frame 110. The second connection element 116 may be integrally formed with or later attached to the second pivoting frame 114 and/or movable with the second pivoting frame 114. Additionally or alternatively, the first connection element 112 and/or the second connection element 116 may be integrally formed with or later attached to the structural frame 102 and the first pivoting frame 110 and/or the second pivoting frame 114 may be movable relative to the second connection element 116.

In some instances, the cutting and harvesting assembly 100 can include a locking element, such as a retainer 142, for maintaining the first pivoting frame 110 and/or the second pivoting frame 114 in their respective first, open or second, pivoted positions. In general, the locking elements may each be configured as a mechanical element, an electrical element, a hydraulic element, a pneumatic element, a combination thereof, and/or any other element capable of maintaining the first pivoting frame 110 and/or the second pivoting frame 114 in the chosen position.

Additionally or alternatively, the cutting and harvesting assembly 100 may include actuators that help move the first pivoting frame 110 and/or the second pivoting frame 114 between their respective first, open or second, pivoted positions. In various examples, the actuators may each be configured as a mechanical actuator, an electrical actuator, a hydraulic actuator, a pneumatic actuator, a combination thereof, and/or any other actuator capable of moving the first pivoting frame 110 and/or the second pivoting frame 114 to the chosen position. Additionally or alternatively, the first pivoting frame 110 and/or the second pivoting frame 114 can be moved manually.

In several examples, the cutting and harvesting assembly 100 is mounted directly, or indirectly, on the front structure of the chassis 12 (FIG. 1) of the agricultural machine 10. Optionally, according to another embodiment of the present invention, this cutting and harvesting assembly 100 is mounted on an independent platform arranged to be coupled and uncoupled in the front portion of the structure of said chassis 12 (FIG. 1) of the agricultural machine 10.

Referring now to FIGS. 10-17, the first line divider set 30 is illustrated according to various aspects of the present disclosure. It will be appreciated that while the first line divider set 30 is described with reference to FIGS. 10-17, the second line divider set 30 may include any of the disclosed features as well. It will further be appreciated that due to the first line divider set 30 being positioned on an opposing side of a vehicle centerline and/or center portion line divider set 30 from the second line divider set 30, the components of the second line divider set 30 may be mirrored from those of the first line divider set 30. In addition, in various examples, the first line divider may rotate laterally inward in a first direction while the second line divider may rotate laterally inward in a second direction. The second rotational direction may be generally opposite to the first rotational direction.

As illustrated, in some examples, the first connection element 112 may include one or more hinges 124 may be operably coupled with the structural frame 102 and the first pivoting frame 110. The one or more hinges 124 may define the rotational axis of the first pivoting frame 110. A hinge shield 126, which is illustrated in greater detail in FIG. 13, may be positioned laterally outward of one or more of the hinges 124 and at least partially cover one or more of the hinges 124. As illustrated, the hinge shield 126 may include a first portion 128 that is positioned at least partially vehicle forward of a hinge pin 130 and a second portion 132 that is vehicle rearward of the first portion 128.

Referring again to FIGS. 10-17, the first connection element 112 may additionally or alternatively include one or more support arms 134 that articulate together with the first pivoting frame 110. Each of the support arms 134 may have any desired geometry, such as a non-linear portion. In addition, the non-linear portion may define a slot 136 therein. A guide 138 may be positioned within the slot 136 and operably coupled with the structural frame 102. In the illustrated examples, the guide 138 is configured as a fastener. However, the guide 138 may be configured as any other structure without departing from the teachings provided herein. While the first pivoting arm is rotated relative to the support frame, the guide 138 may stay within the slot 136 to assist in guiding the first pivoting frame 110 between the first position and the second position, or vice versa. Once the first pivoting frame 110 is placed in the first position and/or the second position, the guide 138 may be tightened to further retain the first pivoting frame 110 in a defined position.

With further reference to FIGS. 14-17, in some examples, the non-linear portion of the first connection element 112 may further define one or more retaining openings 140. In some instances, a retainer 142 may be positioned within the retaining opening 140 to retain the first connection element 112 and, thus, the first pivoting frame 110 in a defined position.

In some instances, the retainer 142 may be positioned in a retainer bracket 144. The retainer bracket 144 may be operably coupled with the structural frame 102. As illustrated, the retainer bracket 144 may include an upper portion 146, an intermediate portion 148, and a bottom portion 150. The intermediate portion 148 may be operably coupled with the structural frame 102, which may be accomplished through one or more fasteners 152 and/or any other fastening method. The upper portion 146 and the bottom portion 150 may extend from the intermediate portion 148 with each defining a retainer void 154. The retainer 142 may extend through each retainer void 154 to align the retainer 142 with the retaining opening 140 when the retaining opening 140 is aligned with the retainer voids 154.

In several examples, a first segment 156 of the retainer 142 may be positioned through the retainer voids 154 and a second segment 158 may be offset from the first segment 156. In some instances, a biasing member 160, such as a spring, may be operably coupled with the first segment 156 of the retainer 142. For instance, the biasing member 160 may be positioned about the retainer 142 at a position between the upper portion 146 and the bottom portion 150 of the retainer bracket 144. The biasing member 160 may be configured to urge the retainer 142 downwardly within the retainer slots defined by the retainer bracket 144.

In various examples, the structural frame 102 may define a retainment hole 162. The second segment 158 of the retainer 142 may extend into the retainment hole 162. As illustrated, the retainment hole 162 may include a first section 164 having a first bottom surface 166 and a second section 168 having a second bottom surface 170. The first bottom surface 166 may be vertically offset from the second bottom surface 170 such that the second segment 158 of the retainer 142 may selectively be retained within the first section 164 and/or the second section 168 through downward force provided by the biasing member 160. Due to the offset heights of the first bottom surface 166 from the second bottom surface 170, the retainer 142 may be positioned within an engaged position when placed in the first section 164 such that the retainer 142 is at least partially positioned within the slot 136 of the first connection element 112. The retainer 142 may alternatively be positioned within a disengaged position when placed in the second section 168 such that the retainer 142 is positioned above the slot 136 of the first connection element 112 thereby allowing for the first connection element 112 and the first pivoting frame 110 to rotate.

Referring still to FIGS. 14-17, in various examples, a locking bracket 172 may be integrally formed with and/or later attached to the first pivoting frame 110. In addition, the structural frame 102 may define a locking hole 174. In use, when the first pivoting frame 110 is moved to the first, open position, a void defined by the bracket may align with the locking hole 174. Once aligned, a fastener 176 may be positioned through the void and the locking hole 174 for retaining the first line divider set 30 in the first position. In such examples, the locking holes 174 may couple with the locking bracket 172 to retain the first pivoting arm in the first position and the retaining holes may be used to retain the first pivoting arm in the second position.

Figure 18:
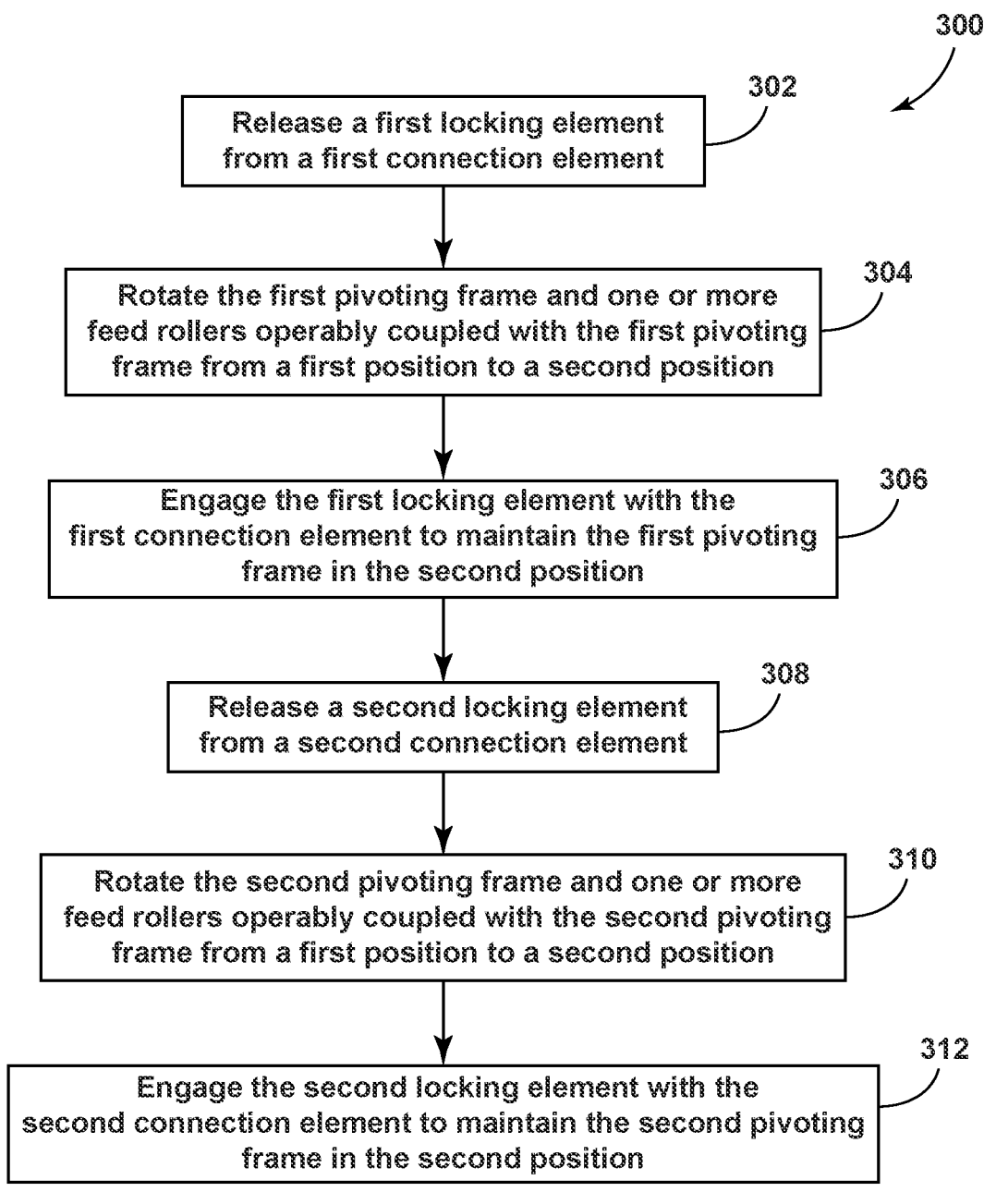
FIG. 18 illustrates a flow diagram of a method for operating a cutting and harvesting assembly for an agricultural machine in accordance with aspects of the present subject matter.
Figure 19:
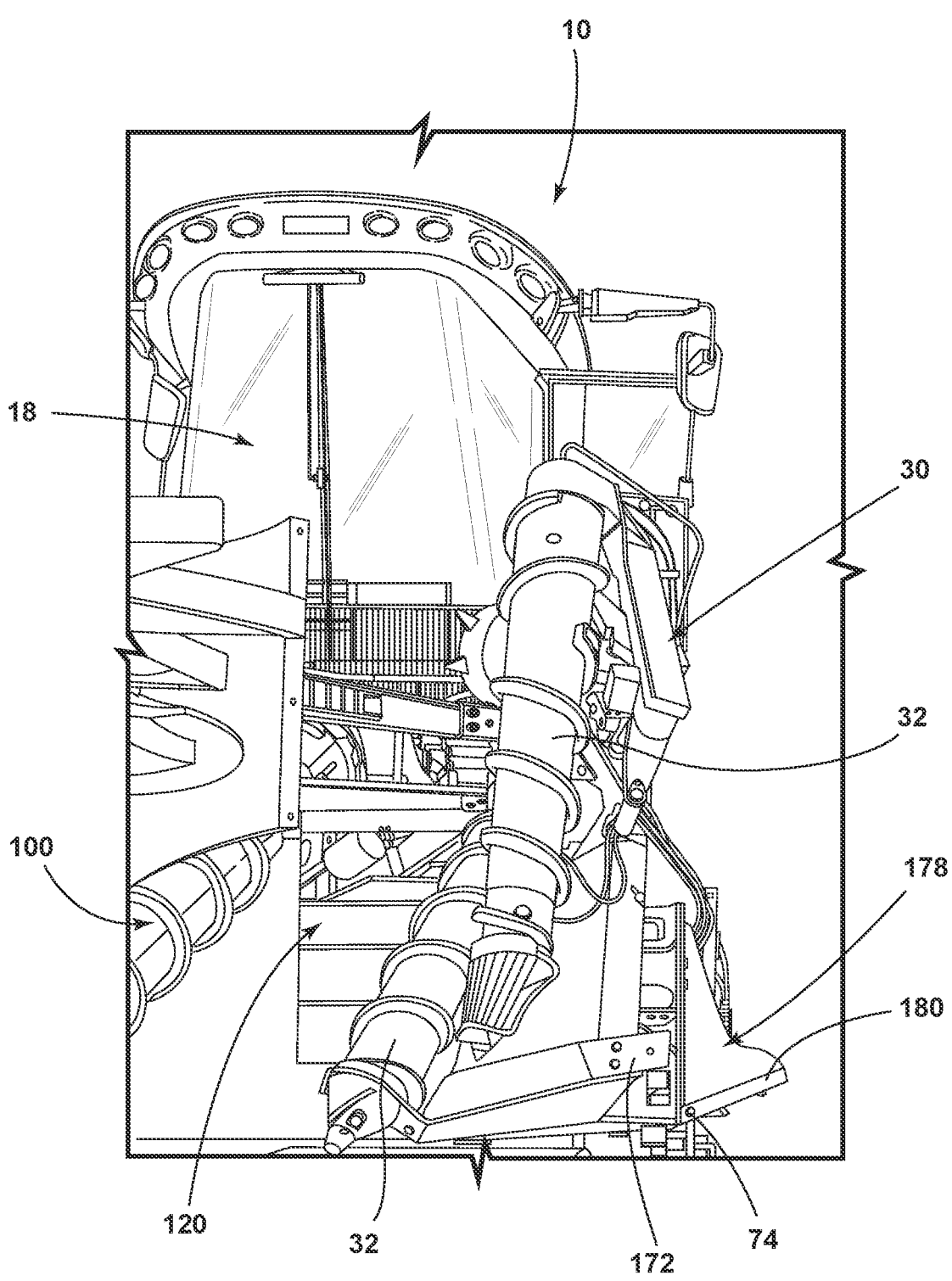
FIG. 19 is a front perspective view of the harvester machine and the cutting and harvesting assembly in accordance with aspects of the present subject matter.

Referring now to FIG. 18, a method 300 for operating a cutting and harvesting assembly for an agricultural machine is illustrated in accordance with aspects of the present subject matter. In general, the method 300 will be described herein with reference to the agricultural machine 10 and the cutting and harvesting assembly 100 described above with reference to FIGS. 1-17. However, the disclosed method 300 may generally be utilized with any suitable cutting and harvesting assembly. In addition, although FIG. 18 depicts steps performed in a particular order for purposes of illustration and discussion, the methods discussed herein are not limited to any particular order or arrangement. One skilled in the art, using the disclosure provided herein, will appreciate that various steps of the methods disclosed herein can be omitted, rearranged, combined, and/or adapted in various ways without deviating from the scope of the present disclosure.

As shown in FIG. 18, at (302), the method 300 can include releasing a first locking element from a first connection element. The first connection element operably couples a first pivoting frame of the harvesting assembly to a structural frame of the harvesting assembly. In some instances, releasing the first locking element from the first connection element can include removing a retainer from a locking aperture defined by the connection element.

At (304), the method 300 can include rotating the first pivoting frame and one or more feed rollers operably coupled with the first pivoting frame from a first position to a second position. The rotation of the first pivoting frame relative to the structural frame may be guided by sliding the first pivoting arm and the first connection element along a guide that is positioned within the one or more retaining openings defined by the first connection element and/or by utilizing a hinge for rotational movement of the first pivoting arm and the first connection element about a defined axis.

At (306), the method 300 can include engaging the first locking element with the first connection element to maintain the first pivoting frame in the second position.

At (308), the method 300 can include releasing a second locking element from a second connection element. The second connection element operably couples a second pivoting frame of the harvesting assembly to the structural frame of the harvesting assembly. In some instances, the first pivoting frame is laterally offset from the second pivoting frame along the structural frame.

At (310), the method 300 can include rotating the second pivoting frame and one or more feed rollers operably coupled with the second pivoting frame from a first position to a second position. The rotation of the second pivoting frame relative to the structural frame may be guided by sliding the second pivoting arm and the second connection element along a guide that is positioned within the one or more retaining openings defined by the second connection element and/or by utilizing a hinge for rotational movement of the second pivoting arm and the second connection element about a defined axis.

At (312), the method 300 can include engaging the second locking element with the second connection element to maintain the second pivoting frame in the second position.

Referring now to FIGS. 19-25, the cutting and harvesting assembly 100 for the agricultural machine 10 may include one or more deflector assemblies 178, which may further be illustrated in FIGS. 4A, 4B, 9A, and 9B. The deflector assemblies 178 may be configured to direct the crops and/or other objects outwardly of the structural frame 102, any other component of the cutting and harvesting assembly 100, a wheel 14, 16 of the machine 10, the chassis 12 of the machine 10, and/or any other component of the machine 10.

Figure 20:
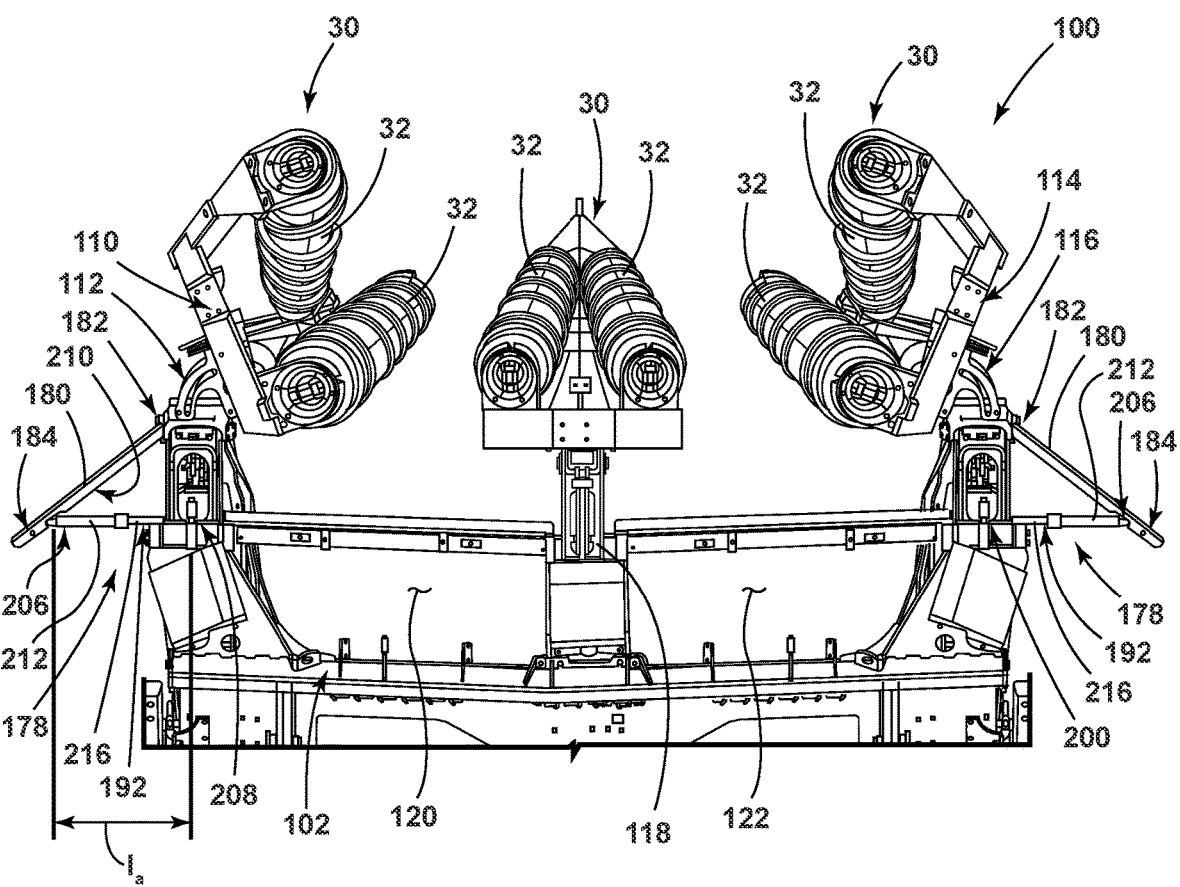
FIG. 20 is a top perspective view of the cutting and harvesting assembly having a pair of deflectors in an extended, first position in accordance with aspects of the present subject matter.
Figure 21:
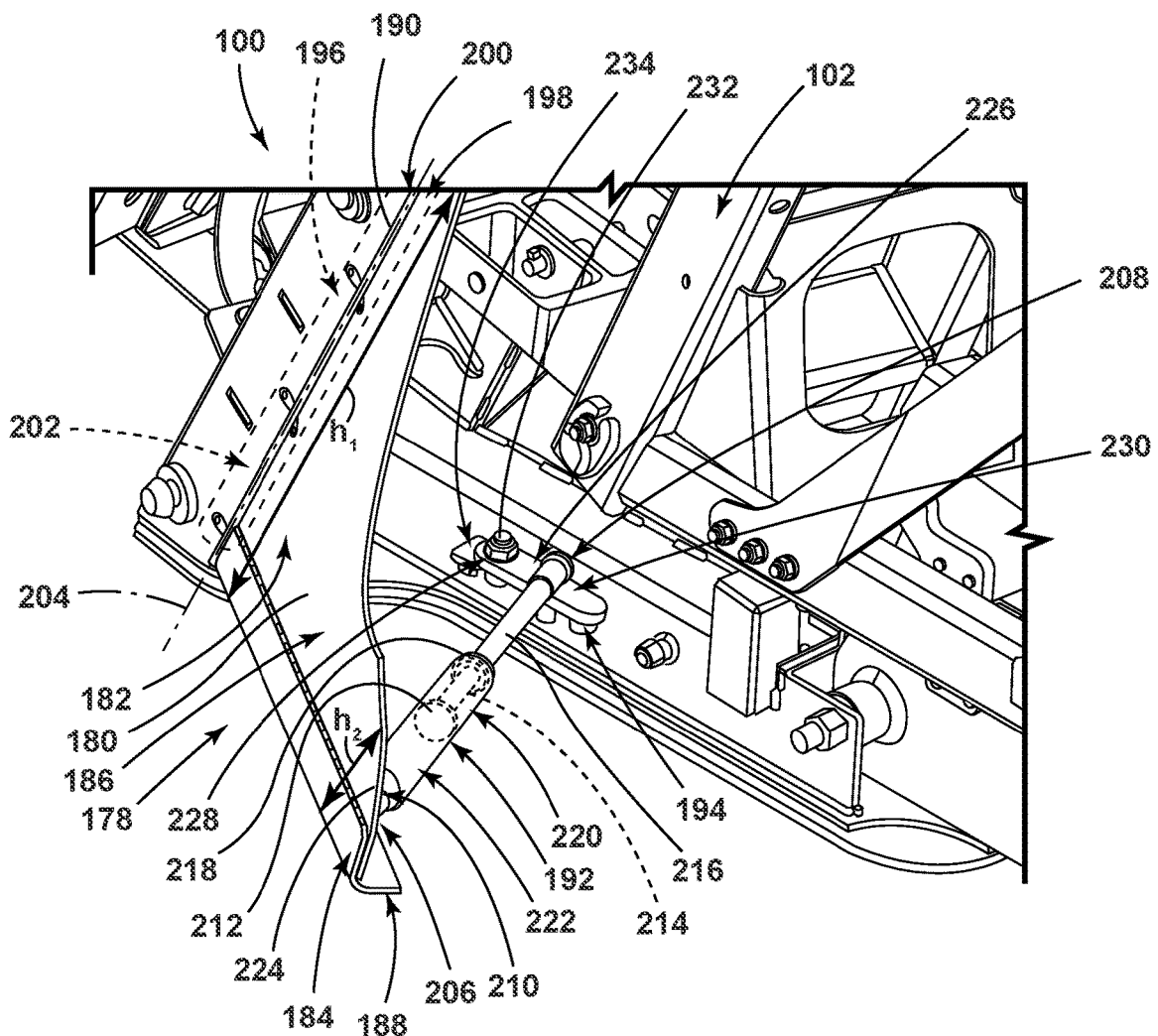
FIG. 21 is a side perspective view of one of the pair of deflectors in the extended, first position in accordance with aspects of the present subject matter.
Figure 22:
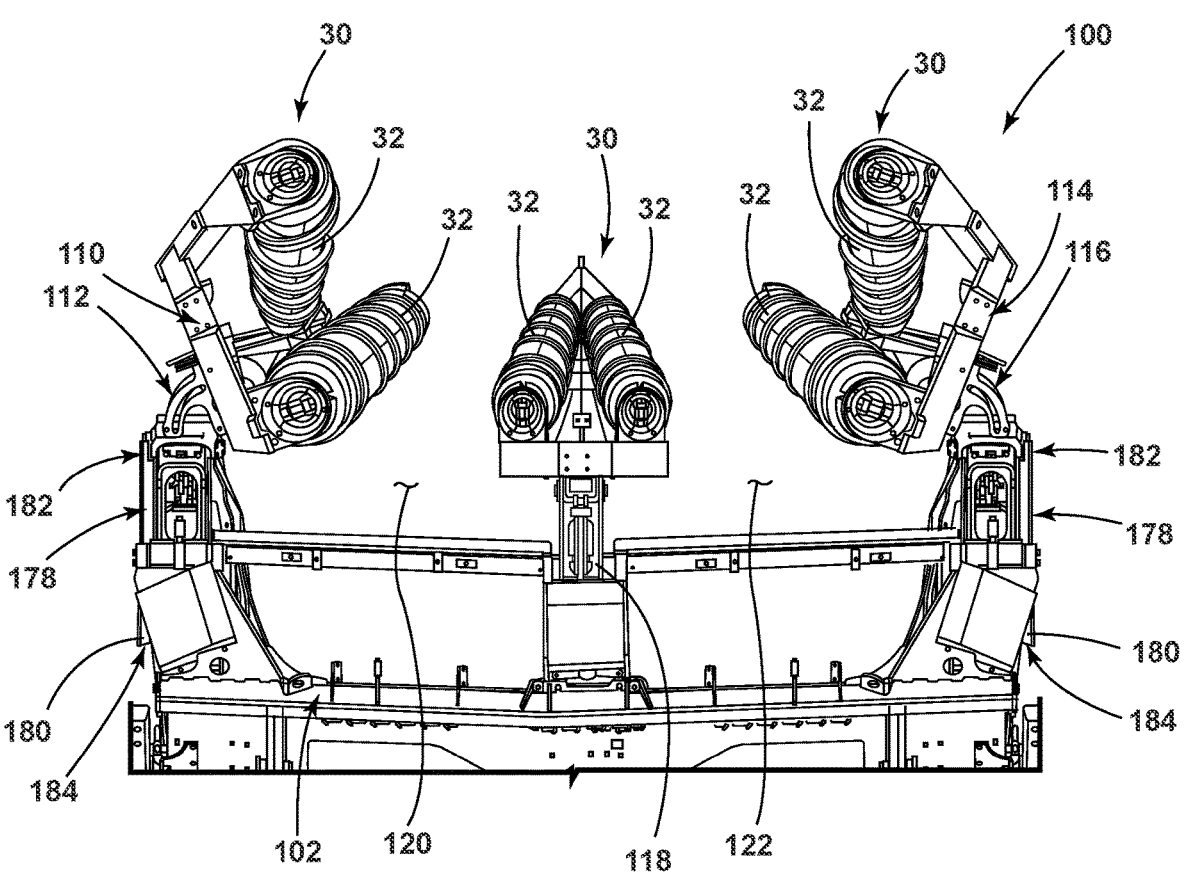
FIG. 22 is a top perspective view of the cutting and harvesting assembly having the pair of deflectors in an intermediate position in accordance with aspects of the present subject matter.
Figure 23:
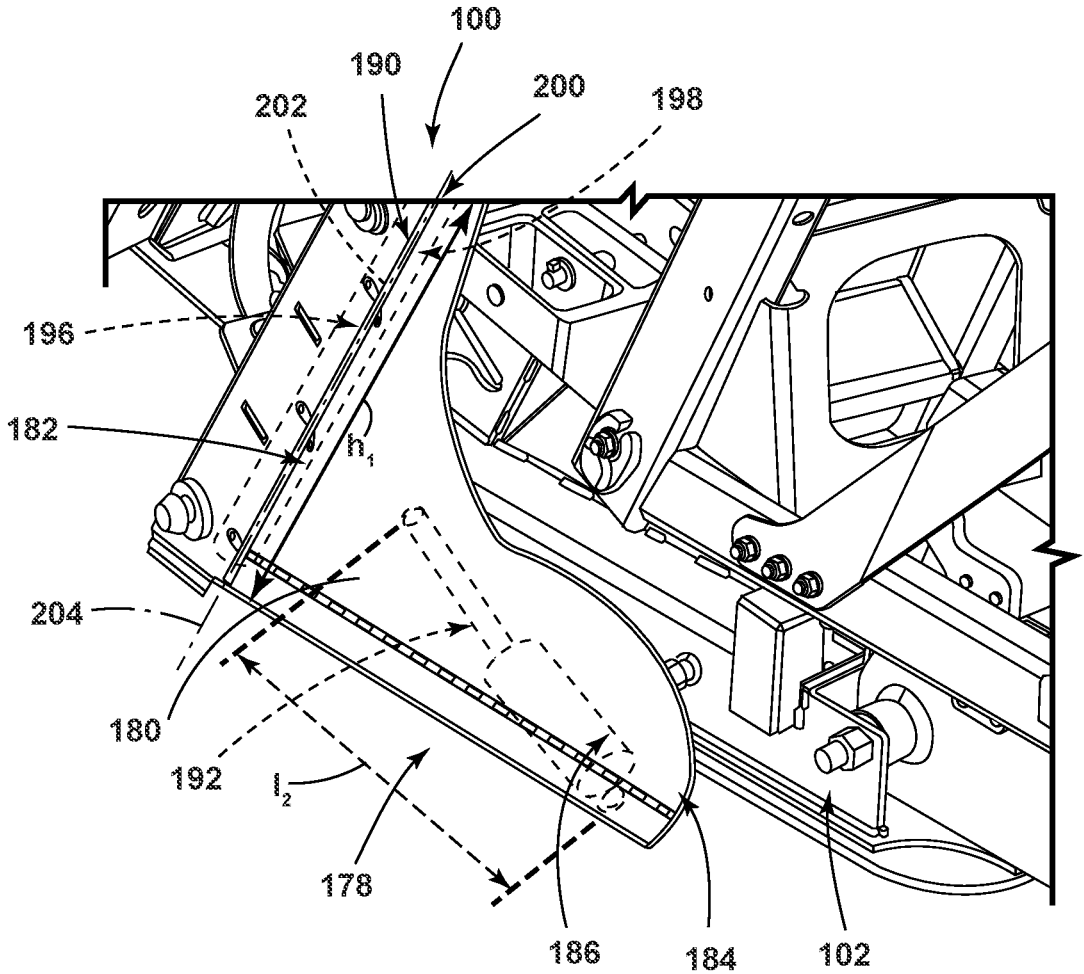
FIG. 23 is a side perspective view of one of the pair of deflectors in the intermediate position in accordance with aspects of the present subject matter.
Figure 24:
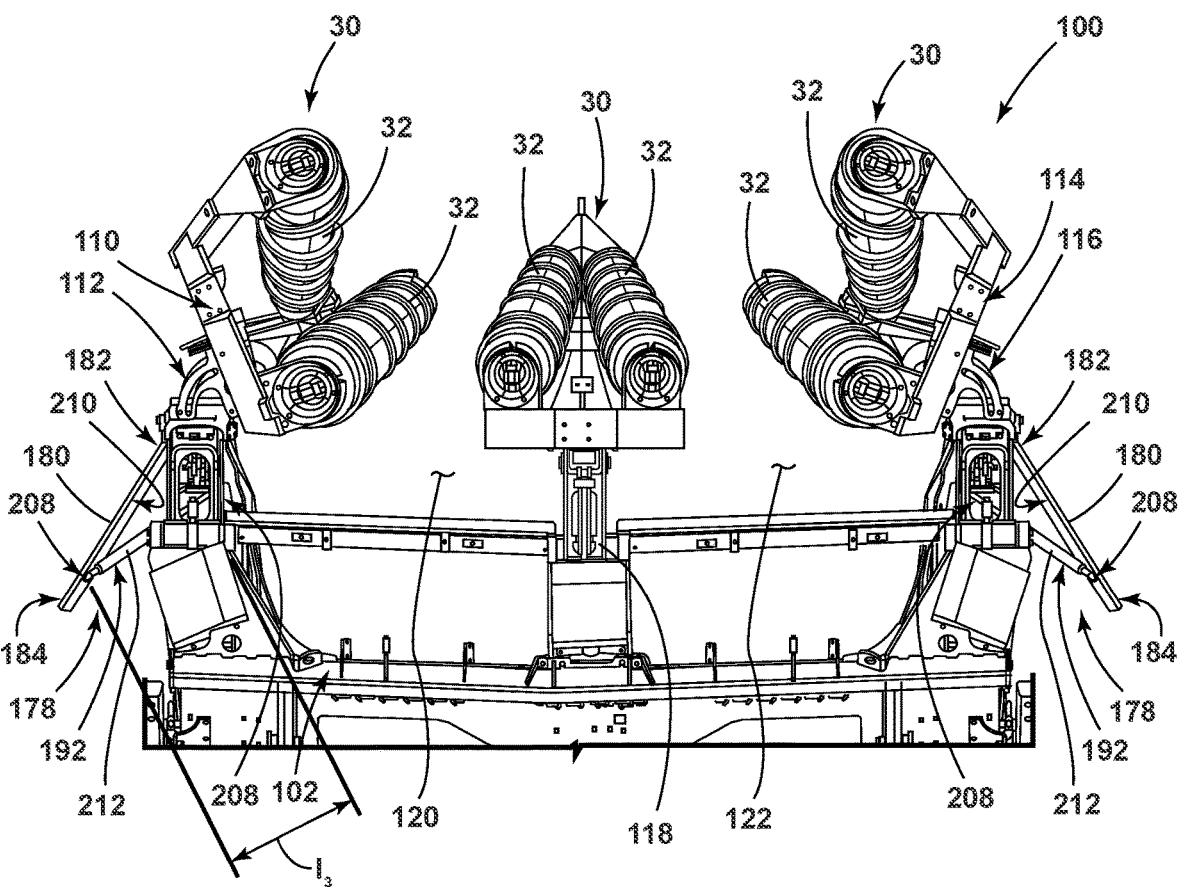
FIG. 24 is a top perspective view of the cutting and harvesting assembly having the pair of deflectors in a folded, second position in accordance with aspects of the present subject matter.
Figure 25:
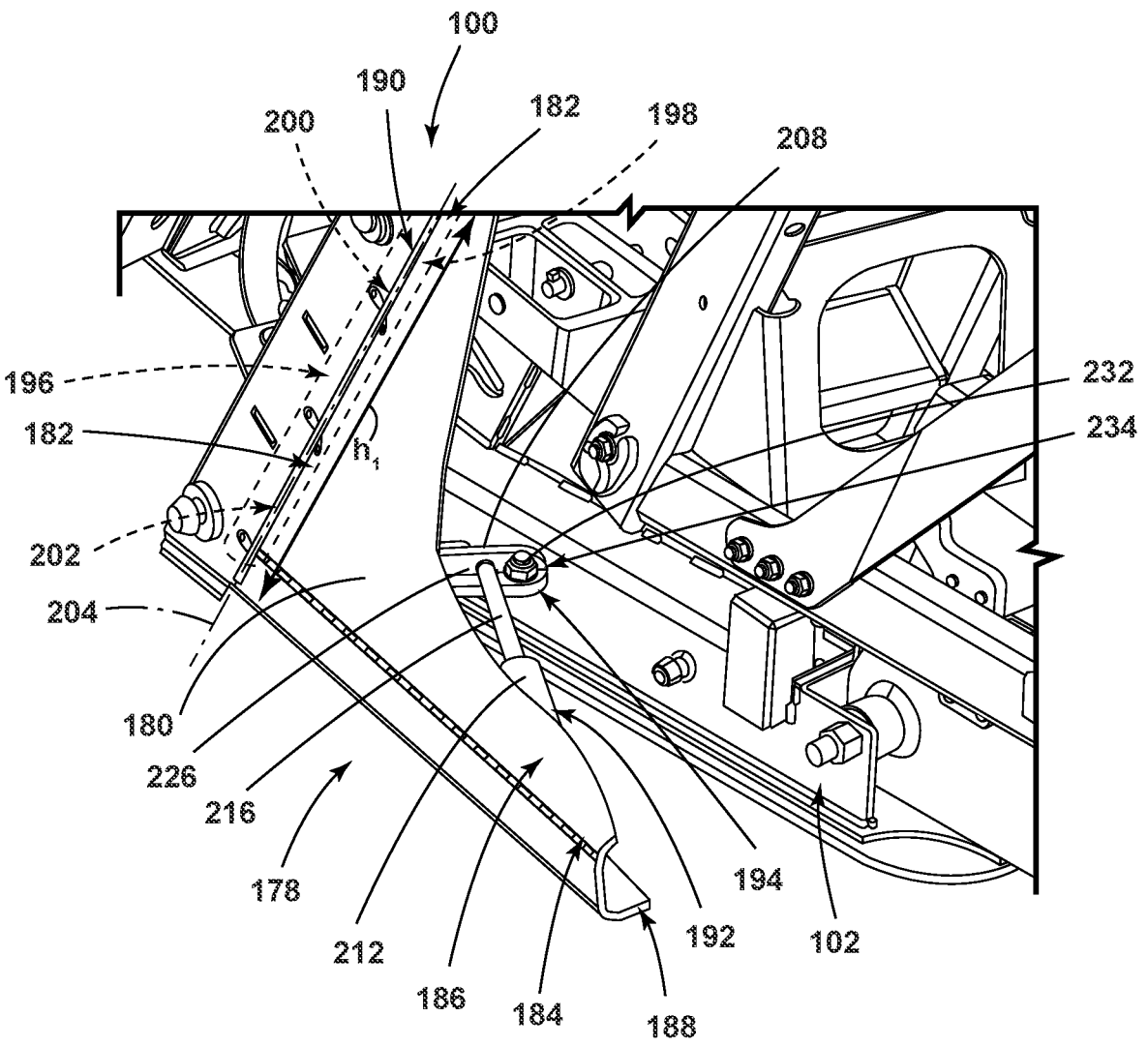
FIG. 25 is a side perspective view of one of the pair of deflectors in the folded, second position in accordance with aspects of the present subject matter.

In the illustrated examples, the deflector assembly 178 includes a deflector plate 180, which may be placed in a plurality of positions. For example, the deflector plate 180 may be placed in a first, operating position in which at least a portion of the deflector plate 180 is positioned laterally outward of the structural frame 102 (as shown in FIGS. 20 and 21), a second position in which at least a portion of the deflector plate 180 is positioned laterally inward of the structural frame 102 (as shown in FIGS. 22 and 23), and/or one or more intermediate positions between the first as second positions (as shown in FIGS. 24 and 25).

It will be appreciated that while a left side deflector assembly 178 is illustrated in FIGS. 19, 21, 23, and 25, a right side deflector assembly 178 may include any of the disclosed features as well. It will further be appreciated that due to the left side deflector assembly 178 being positioned on an opposing side of a vehicle centerline and/or center portion line divider set 30 from the right side deflector assembly 178, the components of the right side deflector assembly 178 may be mirrored from those of the left side deflector assembly 178. In addition, in various examples, the left side deflector assembly 178 may rotate laterally inward in a first direction while the right side deflector assembly 178 may rotate laterally inward in a second direction. The second rotational direction may be generally opposite to the first rotational direction.

With further reference to FIGS. 20-25, the deflector plate 180 may include a first segment 182, which may have a first height $h_1$ in a longitudinal direction, and a second segment 184, which may have a second height $h_2$ in a longitudinal direction. In some instances, the first segment 182 may be generally fore of the second segment 184 when the deflector plate 180 is installed within the cutting and harvesting assembly 100. Furthermore, the deflector plate 180 may include a body portion 186 and a base portion 188 that is offset from the body portion 186. The offset base portion 188 may provide additional bending strength to the deflector plate 180 when crops and/or various objects contact the deflector plate 180.

The deflector assembly 178 can further include a deflector hinge 190, a biasing element 192, and/or a link 194. The deflector hinge 190 may direct the movement of the deflector plate 180 between various positions. The biasing element 192 and/or the link 194 may also assist in directing movement of the deflector plate 180 between the various positions. In addition, the biasing element 192 and/or the link 194 may be configured to retain the deflector plate 180 in a defined position.

In various examples, the deflector hinge 190 may be operably coupled with the first segment 182 of the deflector plate 180. As illustrated, a first leaf 196 of the deflector hinge 190 may be operably coupled with the structural frame 102 that supports a first set of one or more knuckles. A second leaf 198 may be operably coupled to the deflector plate 180 and/or integrally formed with the deflector plate 180 that supports a second set of one or more knuckles with the first set of one or more knuckles and the second set of one or more knuckles defining a barrel 200 of the deflector hinge 190. A pin 202 may be positioned through the barrel 200 and defines a deflector axis 204.

The biasing element 192 may be any device of a variable length or a fixed length and includes a first end portion 206 and an opposing second end portion 208. The first end portion 206 may be operably coupled with an interior portion 210 of the deflector plate 180 and/or the base portion 188 of the deflector plate 180. The second end portion 208 may be operably coupled with the structural frame 102. As such, the biasing element 192 may be configured to assist in retaining the deflector plate 180 in the first position and/or the second position. In some instances, the biasing element 192 may be an assembly that allows for variance in length such that the biasing element 192 may be retracted when contact is made to the deflector plate 180 and/or extended when the deflector plate 180 is moved between the first position and the second position. In various examples, the biasing element 192 can include at least one of a spring, a fluid damper, a magnetic assembly, an electric actuator, a combination thereof, and/or any other practical assembly.

In the illustrated examples, the biasing element 192 is configured as a fluid damper or dashpot that includes a housing 212 filled with a working fluid. A movable piston assembly 214 is slidable within the housing 212. A rod 216 can be attached to the piston assembly 214 and extends outside the damper through a sealed rod guide 218 at a first end section of the housing 212. The piston assembly 214 is configured to have a sliding fit with the inner surface of the housing 212 and divides the housing 212 into a first (e.g., rebound) chamber 220, which may be defined between the rod guide 218 and the main piston assembly 214, and a second (e.g., compression) chamber 222, which may be defined between the piston assembly 214 and a second end section of the housing 212, and provides a damping force during movement thereof.

In addition, a default position may be defined between the first chamber 220 and the second chamber 222 for the piston assembly 214. In operation, when the piston is displaced from the default position in either direction, the piston may be biased to return to the default position. For example, the biasing element 192 may be compressed when various objects and/or crops contact the deflector plate 180, or at any other time, and return to the default position once the object and/or crops are no longer contacting the deflector plate 180. In addition, the biasing element 192 may be extended when positioned in one or more intermediate positions as the deflector plate 180 is moved from the first position to the second position before returning to the default position. Additionally or alternatively, the length of the biasing element 192 may be a first length $l_1$ in the first position and a second length $l_2$ in the second position. In some instances, the second length $l_2$ may be longer than the first length $l_1$ to further retain the deflector plate 180 in the second position.

The link 194 may be integrally formed with the structural frame 102 or later attached thereto through any practicable device. In some examples, the link 194 may have a body 226 that defines a first attachment region 228 and a second attachment region 230. The first attachment region 228 may be configured to receive a fastener 232 for operably coupling the link 194 with an attachment section 234 of the structural frame 102. The second attachment region 230 may be operably coupled with the first end portion 206 of the biasing element 192. In some instances, the body 226 may define additional attachment regions without departing from the teachings provided herein.

In various examples, the link 194 may be attached to the attachment section 234 in a cantilevered nature. In such instances, the second attachment region 230 may be positioned aft of the first attachment region 228 and/or the fastener 232 when the deflector plate 180 is in the first position. Conversely, the second attachment region 230 may be positioned fore of the first attachment region 228 and/or the fastener 232 when the deflector plate 180 is in the second position. In some instances, the link 194 may be configured to rotate about a link axis such that the first portion of the biasing element 192 is aft of the link axis when the deflector plate 180 is in the first position and fore of the link axis when the deflector plate 180 is in the second position.

In operation, when the deflector plate 180 is placed in the first, operating position, as shown in FIGS. 20 and 21, the second segment 184 of the deflector plate 180 can be positioned laterally outward of the structural frame 102. As provided herein, the link 194 may be coupled to the structural frame 102 through a fastener 232. In addition, the first section of the biasing element 192 may be operably coupled with the link 194 at a position along the link 194 that is aft of the fastener 232. With the deflector plate 180 in the first position, the biasing element 192 defines a first length $l_1$ from the first end portion 206 to the second end portion 208 of the biasing element 192.

When the deflector plate 180 is placed in the second, storage position, as shown in FIGS. 22 and 23, at least a portion of the deflector plate 180 (e.g., the second segment 184 of the deflector plate 180) can be positioned laterally inward of the structural frame 102. In addition, the first section of the biasing element 192 may be operably coupled with the link 194 at a position along the link 194 that is fore of the fastener 232. With the deflector plate 180 in the second position, the biasing element 192 defines a second length $l_2$ from the first end portion 206 to the second end portion 208 of the biasing element 192. In some instances, the first length $l_1$ is within ten percent of the second length $l_2$. Additionally or alternatively, the first length $l_1$ may be generally equal to the second length $l_2$. Additionally or alternatively, the first length $l_1$ may be greater than the second length $l_2$. Additionally or alternatively, the first length $l_1$ may be less than the second length $l_2$.

With further reference to FIGS. 22 and 23, as provided herein, in some instances, one or more feed rollers 32 of the cutting and harvesting assembly 100 can be operably coupled with a pivoting frame 110, 114. The pivoting frame 110, 114 allows for movement of the one or more feed rollers 32 between a first, operating position and a second, storage position. In some instances, the feed roller 32 can be configured to rotate in a first, fore direction when moved from a first, operating position to a second, storage position. Conversely, in some instances, the deflector plate 180 can be configured to rotate in a second, aft direction when moved from a first, operating position to a second, storage position. As such, the one or more feed rollers 32 can be rotated in a first direction when moved from the first, operating position to the second storage position and the deflector plate 180 can be rotated in a second, opposing direction when moved from the first, operating position to the second storage position.

In addition, as shown in FIGS. 22 and 23, the structural frame 102 can extend laterally outward of the line divider set 30 when the line divider set 30 is rotated to the second, storage position and laterally outward of the deflector plate 180 when the deflector plate 180 is rotated to the second, storage position.

With further reference to FIGS. 24 and 25, in instances in which the link 194 may be rotated about the fastener 232, the deflector plate 180 may be placed in a plurality of intermediate positions between the first position and the second position. While in an intermediate position, the link 194 may be rotated less than 180 degrees. In addition, the biasing element 192 defines a third length $l_3$ from the first end portion 206 to the second end portion 208 of the biasing element 192. In some instances, the third length $l_3$ is within ten percent of the first length $l_1$ and/or the second length $l_2$. Additionally or alternatively, the third length $l_3$ may be generally equal to the first length $l_1$ and/or the second length $l_2$. Additionally or alternatively, the third length $l_3$ may be greater than the first length $l_1$ and/or the second length $l_2$. Additionally or alternatively, the third length $l_3$ may be less than the first length $l_1$ and/or the second length $l_2$.

Figure 26:
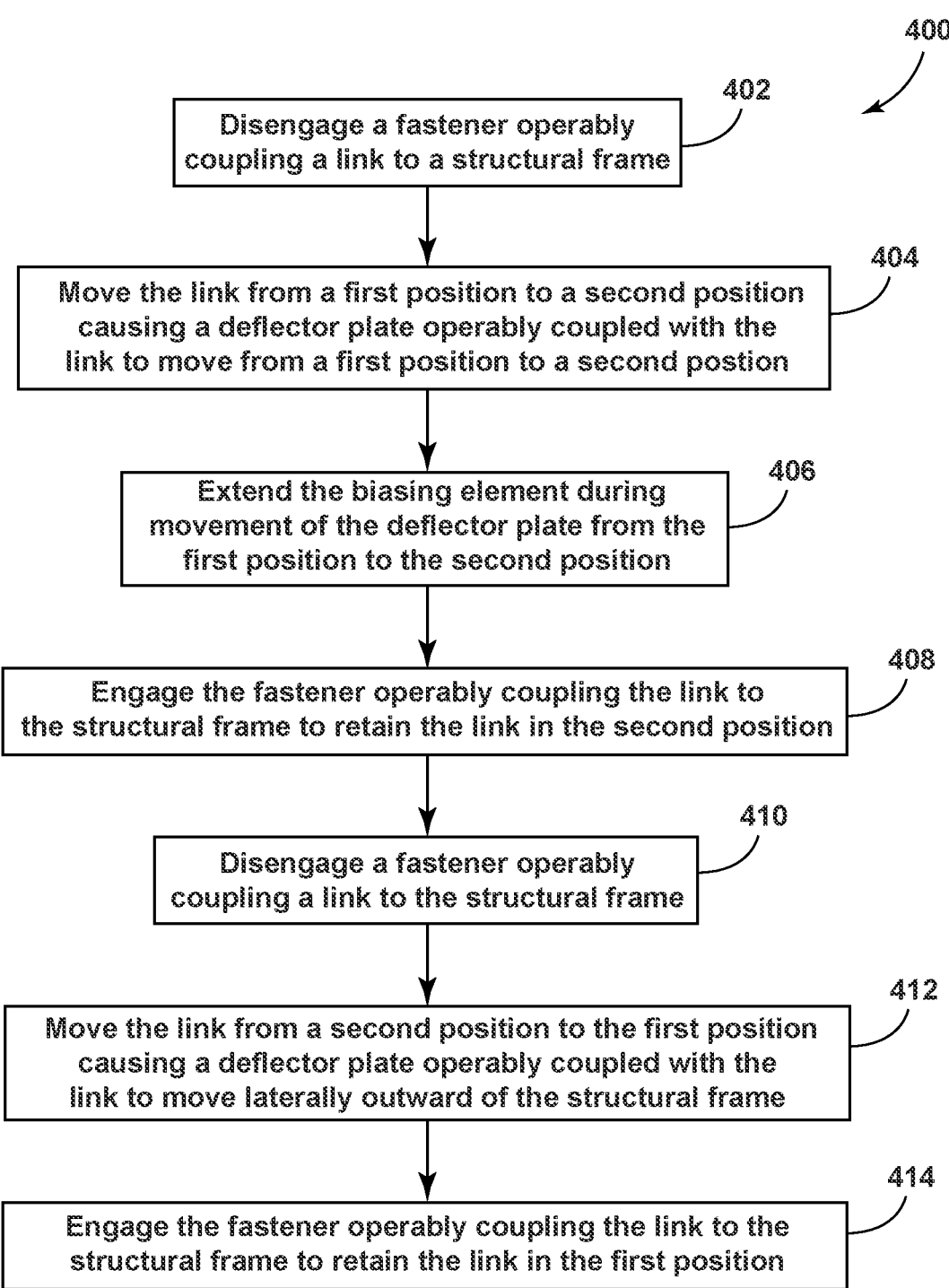
FIG. 26 illustrates a flow diagram of a method for operating a cutting and harvesting assembly for an agricultural machine in accordance with aspects of the present subject matter.

Referring now to FIG. 26, a method 400 for operating a cutting and harvesting assembly for an agricultural machine is illustrated in accordance with aspects of the present subject matter. In general, the method 400 will be described herein with reference to the agricultural machine 10 and the cutting and harvesting assembly 100 described above with reference to FIGS. 1-17 and 19-25. However, the disclosed method 400 may generally be utilized with any suitable cutting and harvesting assembly. In addition, although FIG. 26 depicts steps performed in a particular order for purposes of illustration and discussion, the methods discussed herein are not limited to any particular order or arrangement. One skilled in the art, using the disclosure provided herein, will appreciate that various steps of the methods disclosed herein can be omitted, rearranged, combined, and/or adapted in various ways without deviating from the scope of the present disclosure.

As shown in FIG. 26, at (402), the method 400 can include disengaging a fastener operably coupling a link to a structural frame. As provided herein, the deflector plate can be operably coupled with the link by a biasing element. A first end portion of the biasing element can be operably coupled with the link and a second end portion of the biasing element can be operably coupled with the deflector plate.

At (404), the method 400 can include moving the link from a first position to a second position causing the deflector plate operably coupled with the link to move from a first position to a second position. As provided herein, the movement of the link may be a rotational movement about a link axis. Additionally or alternatively, movement of the link may be in any other manner and may include completely detaching the link from the structural frame. At (406), the method 400 can include extending the biasing element during the movement of the deflector plate from the first position to the second position.

At (408), the method 400 can include engaging the fastener operably coupling the link to the structural frame to retain the link in the second position. With the link in the second position, at least a portion of the deflector plate can be positioned laterally inward of the structural frame in the second position.

At (410), the method 400 can include disengaging the fastener operably coupling the link to the structural frame. At (412), the method 400 can include moving the link from the second position to the first position causing the deflector plate operably coupled with the link to move laterally outward of the structural frame. In addition, at (414), the method 400 can include engaging the fastener operably coupling the link to the structural frame to retain the link in the first position.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A cutting and harvesting assembly of an agricultural machine, the cutting and harvesting assembly comprising:
   a structural frame;
   a feed roller operably coupled with the structural frame;
   a deflector assembly operably coupled with the structural frame, the deflector assembly including a deflector plate at least partially laterally outward of the feed roller, wherein the deflector plate is rotatable between a first position and a second position relative to the structural frame, wherein a second segment of the deflector plate is positioned laterally outward of the structural frame in the first position and laterally inward of the structural frame in the second position; and
   a deflector hinge operably coupling a first segment of the deflector plate to the structural frame, the deflector hinge defining a deflector axis.

2. The cutting and harvesting assembly of claim 1, wherein the deflector assembly further comprises:
   a biasing element including a first end portion operably coupled with an interior portion of the deflector plate and a second end portion operably coupled with the structural frame.

3. The cutting and harvesting assembly of claim 2, wherein the biasing element includes at least one of a spring, a fluid damper, a magnetic assembly, an electric actuator, or a combination thereof.

4. The cutting and harvesting assembly of claim 2, wherein the biasing element defines a first length from the first end portion to the second end portion when the deflector plate is in the first position and a second length from the first end portion to the second end portion when the deflector plate is in the second position, and
   wherein the first length is within ten percent of a second length.

5. The cutting and harvesting assembly of claim 2, further comprising:
   a link operably coupled with the first end portion of the biasing element and the structural frame.

6. The cutting and harvesting assembly of claim 5, wherein the link enables rotation about a link axis, and
   wherein a first portion of the biasing element is aft of the link axis when the deflector plate is in the first position and fore of the link axis when the deflector plate is in the second position.

7. The cutting and harvesting assembly of claim 1, wherein the feed roller is operably coupled with a pivoting frame, and
   wherein the feed roller enables rotation in a fore direction when moved from a first operating position to a second storage position.

8. A cutting and harvesting assembly of an agricultural machine, the cutting and harvesting assembly comprising:
   a structural frame;
   a line divider set operably coupled with the structural frame, the line divider set comprising a pivoting frame and one or more feed rollers operably coupled with the pivoting frame, wherein the one or more feed rollers is rotatable in a first direction when moved from a first operating position to a second storage position;
   a deflector assembly operably coupled with the structural frame, the deflector assembly rotatable between a first position and a second position relative to the structural frame;
   a biasing element comprising a first end portion operably coupled with an interior portion of a deflector plate, wherein the deflector plate is rotatable in a second opposing direction when moved from the first operating position to the second storage position; and
   a link operably coupled with the structural frame and the first end portion of the biasing element.

9. The cutting and harvesting assembly of claim 8, further comprising:
   a deflector hinge operably coupling the deflector plate of the deflector assembly to the structural frame, the hinge defining a rotational axis of the deflector plate.

10. The cutting and harvesting assembly of claim 8, wherein the biasing element comprises a second end portion operably coupled with the structural frame.

11. The cutting and harvesting assembly of claim 8, wherein the structural frame extends laterally outward of the line divider set when the line divider set is rotated to the second storage position and laterally outward of the deflector plate when the deflector plate is rotated to the second storage position.

12. A method of operating a cutting and harvesting assembly of an agricultural machine, the method comprising:

disengaging a fastener operably coupling a link to a structural frame;

at least one from among moving the link from a first position to a second position causing a deflector plate operably coupled with the link to move from the first position to the second position and moving the link from the second position to the first position causing the deflector plate operably coupled with the link to move laterally outward of the structural frame; and engaging the fastener operably coupling the link to the structural frame to retain the link in the respective second position or the first position;

wherein the deflector plate is operably coupled with the link by a biasing element, and wherein the biasing element is extended during the moving of the deflector plate from the first position to the second position.

13. The method of claim 12, wherein a first end portion of the biasing element is operably coupled with the link and a second end portion of the biasing element is operably coupled with the deflector plate.

14. The method of claim 13, wherein at least a portion of the deflector plate is positioned laterally inward of the structural frame in the second position.

\* \* \* \* \*